US012312978B2

(12) United States Patent
Whyte

(10) Patent No.: US 12,312,978 B2
(45) Date of Patent: May 27, 2025

(54) GUIDE VANES FOR FULLY REVERSIBLE TURBOMACHINERY

(71) Applicant: HOWDEN AXIAL FANS APS, Naestved (DK)

(72) Inventor: William Murray Whyte, Glasgow (GB)

(73) Assignee: Howden Axial Fans APS, Naestved (DK)

( * ) Notice: Subject to any disclaimer, the term of this patent is extended or adjusted under 35 U.S.C. 154(b) by 0 days.

(21) Appl. No.: 18/447,350

(22) Filed: Aug. 10, 2023

(65) Prior Publication Data

US 2023/0383664 A1 Nov. 30, 2023

Related U.S. Application Data

(63) Continuation of application No. PCT/IB2022/051428, filed on Feb. 17, 2022.

(Continued)

(51) Int. Cl.
*F01D 9/04* (2006.01)

(52) U.S. Cl.
CPC .......... *F01D 9/041* (2013.01); *F05D 2240/12* (2013.01); *F05D 2250/14* (2013.01); *F05D 2250/33* (2013.01)

(58) Field of Classification Search
CPC . F01D 9/041; F01D 5/141; F01D 9/02; F05D 2240/12; F05D 2250/14;

(Continued)

(56) References Cited

U.S. PATENT DOCUMENTS 3,464,357 A * 9/1969 Martin .................. F04D 29/548 114/151
6,116,856 A * 9/2000 Karadgy ............... F04D 29/384 29/889.6
2021/0388725 A1* 12/2021 Gea Aguilera ........... B64C 3/10

FOREIGN PATENT DOCUMENTS

CN 1693717 A * 11/2005
CN 104564842 A * 4/2015

(Continued)

OTHER PUBLICATIONS

Notification of International Search Report and Written Opinion including International Search Report and Written Opinion for International Application No. PCT/IB2022/051428 mailed May 27, 2022, 16 pages.

(Continued)

*Primary Examiner* — Woody A Lee, Jr.
*Assistant Examiner* — Eric A Lange
(74) *Attorney, Agent, or Firm* — Edell, Shapiro & Finnan, LLC

(57) ABSTRACT

A guide vane optimized for fully reversible turbomachinery where the guide vane is substantially planar, and has a profiled first edge and an opposite symmetrical second edge. The profiled first edge may include a first arc and a second arc, where the first and second arc differ from one another in their shape characteristics (e.g., arc length, arc height, curvature, radius, etc.). The second edge may be symmetrically rounded. When the guide vane is disposed downstream from the impeller, the profiled first edge serves as a leading edge of the guide vane, and is configured to efficiently convert rotational flow coming from the impeller into axial flow. When the guide vane is disposed upstream from the impel- (Continued)

ler, the profiled first edge serves as a trailing edge of the guide vane, and is configured to maintain the axial flow as the flow enters the impeller.

19 Claims, 17 Drawing Sheets

Related U.S. Application Data

(60) Provisional application No. 63/151,950, filed on Feb. 22, 2021.

(58) Field of Classification Search
CPC ............ F05D 2250/33; F05D 2250/70; F05D 2250/72; F05D 2250/73; F05D 2240/121; F05D 2240/122; F05D 2240/123; F05D 2240/124; F04D 19/005; F04D 29/544
See application file for complete search history.

(56) References Cited

FOREIGN PATENT DOCUMENTS

| | | | | |
|---|---|---|---|---|
| CN | 109595788 | B | * | 1/2021 |
| DE | 102019007452 | B3 | * | 10/2020 |
| WO | 2010124762 | A2 | | 11/2010 |

OTHER PUBLICATIONS

Setoguchi T et al, “A review of impulse turbines for wave energy conversion”, Renewable Energy, Pergamon Press, Oxford, GB, vol. 23, No. 2, Jun. 1, 2001, pp. 261-292, XP002460979, ISSN: 0960-1481, DOI: 10.1016/S0960-1481(00) 00175-0 p. 261, paragraph 1, p. 266; figure 2, 32 pages.

* cited by examiner

GUIDE VANES FOR FULLY REVERSIBLE TURBOMACHINERY

CROSS-REFERENCE TO RELATED APPLICATIONS

This application is a continuation of and claims the benefit of and priority under 35 U.S.C. 120 to PCT Patent Application No. PCT/IB2022/051428, entitled "GUIDE VANES FOR FULLY REVERSIBLE TUROMACHINERY", filed Feb. 17, 2022, which claims the benefit of and priority under 35 U.S.C. 119(e) to U.S. Provisional Patent Application Ser. No. 63/151,950, entitled "GUIDE VANES FOR FULLY REVERSIBLE TUROMACHINERY", filed Feb. 22, 2021. The disclosure of each of the above-identified patent applications is incorporated herein by reference in its entirety for all purposes.

FIELD OF THE INVENTION

The present invention relates to turbomachinery, in particular, guide vanes for fully reversible turbomachinery.

BACKGROUND OF THE INVENTION

In turbomachinery, it is desirable to maximize the performance efficiency by optimizing components of the turbomachinery (e.g., impeller blades, guide vanes, etc.) to convert rotating flow into useful axial flow that exits the turbomachinery. One way to convert a rotating flow into an axial flow is through guide vanes. For unidirectional turbomachinery, in order to prevent separation of the flow from the guide vanes, the guide vanes are optimized by aligning the leading edge of the guide vanes to the rotational flow exiting the turbomachinery's impeller. The rotational flow is then reoriented to an axial flow by the curvature/camber of the guide vane, which ideally results in minimal separation of the flow and a gain of static pressure.

In fully reversible turbomachinery, however, there is a degree of symmetry required in the design of the components (e.g., impeller blades, guide vanes, etc.) to ensure that the performance is the similar in both operating directions (i.e., a "forward" flow direction and a "reverse" flow direction). Because of this, guide vanes for fully reversible turbomachinery cannot be optimally designed with a curvature/camber like that of typical guide vanes for unidirectional turbomachinery. Instead, guide vanes for fully reversible turbomachinery are limited to containing a substantially straight or planar profile, and are limited to a substantially parallel orientation with respect to the shaft axis of the impeller. Utilizing guide vanes in fully reversible turbomachinery that have been designed to straighten the rotational flow coming from the impeller with camber, and that have a non-axial orientation, results in the guide vanes imparting a pre-swirl or pre-rotation of the flow that enters the impeller when the flow is operating in the reverse direction. This is because the normally downstream guide vanes are operating as upstream guide vanes when the fully reversible turbomachinery operates in the reverse flow direction. Converting the axial flow to a rotational flow by the upstream guide vanes adversely affects the performance of the fully reversible turbomachinery by namely reducing the pressure of the machine and negatively shifting the peak efficiency operating point. If cambered guide vanes are used in fully reversible turbomachinery, in order to counter the drop in pressure of the flow entering the impeller, the pitch angle of the cambered guide vanes would have to be increased. However, when increasing the pitch angle of a cambered guide vane that is operating upstream of the impeller, the same guide vanes would no longer be optimized when operating downstream from the impeller because the guide vane would result in separated flow. Thus, it is difficult to design guide vanes that straighten the rotational flow coming from an impeller without having large amounts of separating flow that results in a reduction of the performance and efficiency of the turbomachinery. As a result, with fully reversible turbomachinery, manufacturers have not typically optimized the design of the guide vanes to convert rotating flow into axial flow.

When attempting to optimize fully reversible turbomachinery, it is typically difficult to exceed an efficiency of approximately 70-73%. For example, illustrated in FIG. 1A is a fully reversible axial fan, used in tunnel ventilation environments, with flat plate guide vanes. As further illustrated in FIG. 1B, which is a graph that presents non-dimensional power (λ) and pressure (ψ) coefficients vs. a non-dimensional flow coefficient (φ) vs. efficiency (η) for the fully reversible axial fan shown in FIG. 1A, the efficiency of the fully reversible tunnel axial fan illustrated in FIG. 1A does not exceed 70%. This typical efficiency range for fully reversible fans is further shown in the graphs presented in FIGS. 2 and 3, which are efficiency plots for two additional reversible tunnel axial fans. More specifically, FIGS. 2 and 3 each illustrate an efficiency contour that is plotted over a graph of the total power vs. volume flow rate for two other types of fully reversible tunnel axial fans, where the efficiency of both of these reversible tunnel axial fans is approximately 72.4%. Even reversible jet fans typically to not exceed an efficiency of approximately 73.5%, which is shown in the graph illustrated in FIG. 4 that plots efficiency vs. thrust for various reversible jet fans.

Other attempts to optimized fully reversible turbomachinery include the development of contra-rotating impellers that remove the need for guide vanes and results in higher claimed efficiencies. However, this approach typically result in a higher cost, more mechanical design complexity, and increased noise from the turbomachinery. In other examples, manufacturers have also designed semi-reversible turbomachinery. Effectively, this is a normal operating direction (i.e., "forward" direction) machine, which has some minor modifications to the impeller blades, such as rounding of edges of the impeller blades, allowing the impeller blades to be rotated to face in the reverse direction, etc. FIG. 5 illustrates an example of a semi-reversible fan, where the impeller only rotates in one direction, but where the impeller blades may be rotated to a specific pitch angle to generate a desired forward flow or reversible flow. While this may result in a turbomachine that performs significantly better in the forward direction, the increased performance in the forward direction comes at expense of the performance in the reverse direction.

Because of the need to maintain generally symmetrical guide vanes for fully reversible turbomachinery, manufacturers have tried to increase the efficiency of fully reversible turbomachinery by attempting to optimize the blades of the impeller of fully reversible turbomachinery. FIG. 6 illustrates a graph of various parametric optimization testing for impeller blades of reversible jet fans, where the total efficiency of each parametric setup is presented vs. the power. As shown in FIG. 6, even when optimizing the blades of an impeller of a reversible jet fan, the total efficiency of the reversible jet fan never exceeds an efficiency percentage in the low to mid-seventies. Furthermore, illustrated in FIG. 7 is a reversible axial fan impeller, where the blade profiles have allegedly been optimized for fully reversible axial fan operations. Despite this optimization of the fan blades of the impeller, the manufacturer only claims that reversible axial fans equipped with the optimized impeller have an efficiency of 74%.

As a result, it is generally accepted in the industry and in academia that not much can be done about the lower efficiencies of fully reversible turbomachinery when compared to unidirectional turbomachinery due to design restrictions imposed by the symmetry requirements of the fully reversible turbomachinery. For example, it is common practice in the industry that the guide vanes are symmetrical, which limits optimal curvature (if any), and also the possibilities to optimize aerodynamics at the inlet and outlet side (i.e., outlet diffusers, inlet vanes, etc.).

Thus, what is needed is a guide vane for fully reversible turbomachinery that, when operating in a downstream mode, may be optimized to convert swirling/rotational flow coming from the impeller into axial flow that exits the turbomachinery, and that, when operating in an upstream mode, does not produce pre-rotational/pre-swirling flow (i.e., maintains an axial flow) that enters the impeller.

SUMMARY OF THE INVENTION

The present invention is directed to a guide vane configured for use in fully reversible turbomachinery. The guide vane may be substantially planar, and may have a profiled first edge and an opposite symmetrical second edge. The profiled first edge may have a shape that is defined by at least a first arc/curvature and a second arc/curvature that collectively form the profiled first edge, where the first arc/curvature and the second arc/curvature differ in their shape parameters/characteristics (e.g., arc length, arc height, curvature, radius, etc.). In some other embodiments, the profiled first edge may be either a substantially circular quarter arc or a substantially elliptical quarter arc. The second edge may be symmetrically rounded. The profiled first edge and symmetrically rounded second edge enable the guide vane to efficiently direct or influence the flow through the fully reversible turbomachinery regardless of whether the turbomachinery is operating in a forward direction (i.e., the impeller is rotating in a first direction) or a reverse direction (i.e., the impeller is rotating in a second direction opposite the first direction). When the guide vane is disposed downstream from the impeller of a fully reversible turbomachine, the profiled first edge may serve as a leading edge of the guide vane, and may be configured to efficiently convert rotational flow coming from the impeller into axial flow. When the guide vane is disposed upstream from the impeller of a fully reversible turbomachine, the profiled first edge may serve as a trailing edge of the guide vane, and may be configured to maintain the axial flow as the flow enters the impeller.

In one embodiment, a guide vane for fully reversible turbomachinery includes a planar structure having an asymmetrical first edge and an opposite symmetrical second edge. The asymmetrical first edge being configured to turn rotational flow exiting an impeller of the fully reversible turbomachinery into axial flow.

In some instances, the asymmetrical first edge may contain a first arc and a second arc that collectively define the asymmetrical first edge. In some further instances, the guide vane may further include an upper planar surface and an opposite lower planar surface. The upper planar surface and the lower planar surface may each span between the asymmetrical first edge and the symmetrical second edge. In some even further instances, the first arc may curve downwardly from the upper planar surface and the second arc may curve upwardly from the lower planar surface. The upper planar surface may have a first length spanning between the asymmetrical first edge and the symmetrical second edge. The lower planar surface may have a second length spanning between the asymmetrical first edge and the symmetrical second edge. The first length may be greater than the second length.

In some additional instances, the first arc may have a first curvature length and a first curvature height, while the second arc may have a second curvature length and a second curvature height. The second curvature length may be greater than the first curvature length, and the second curvature height may be greater than the first curvature height. In some even additional instances, the first arc may be a first elliptical quarter arc shape and the second arc may be a second elliptical quarter arc shape. The dimensions of the second elliptical quarter arc shape may differ from the dimensions of the first elliptical quarter arc shape. Furthermore, in some other instances, the symmetrical second edge may contain a symmetrical rounded shape.

In another embodiment, a fully reversible turbomachinery may include an impeller and one or more guide vanes disposed in proximity to the impeller. The impeller may be configured to rotate in a first rotational direction, where the impeller rotating in the first rotational direction may cause gas to flow in a first flow direction through the fully reversible turbomachinery. The impeller may also be configured to rotate in a second rotational direction, where the impeller rotating in the second rotational directions causes the gas to flow in a second flow direction through the fully reversible turbomachinery. The second rotational direction may be opposite of that of the first rotational direction, and the first flow direction may be opposite of the second flow direction. Each of the one or more guide vanes may contain an asymmetrical first edge and a symmetrical second edge opposite of the asymmetrical first edge. The asymmetrical first edge is configured to convert a rotational flow exiting the impeller into a downstream axial flow. Moreover, each guide vane may be disposed in proximity to the impeller such that the asymmetrical first edge is disposed more proximate to the impeller than the symmetrical second edge.

In some instances, the impeller may include a first side and an opposing second side. The one or more guide vanes may include at least a first guide vane and a second guide vane. The first guide vane may be disposed more proximate to the first side of the impeller than the second side of the impeller. The second guide vane may be disposed more proximate to the second side of the impeller than the first side. In some further instances, when the impeller rotates in the first rotational direction, the first guide vane may be configured to maintains an upstream axial flow as an axial flow as it enters the impeller, while the second guide vane may be configured to convert the rotating flow exiting the impeller into the downstream axial flow. In some even further instances, the asymmetrical first edge of the second guide vane may convert the rotational flow exiting the impeller into the downstream axial flow.

Furthermore, in some additional instances, when the impeller rotates in the second rotational direction, the second guide vane may be configured to maintains an upstream axial flow as an axial flow as it enters the impeller, while the first guide vane may be configured to convert the rotating flow exiting the impeller into the downstream axial flow. In some further instances, the asymmetrical first edge of the first guide vane may convert the rotational flow exiting the impeller into the downstream axial flow.

In some even further instances, the asymmetrical first edge of each of the one or more guide vanes may contain a first arc and a second arc that collectively define the asymmetrical first edge. Moreover, the first arc may have a first curvature length and a first curvature height, while the second arc may have a second curvature length and a second curvature height. The second curvature length may be greater than the first curvature length, and the second curvature height may be greater than the first curvature height. In even some further instances, the first arc may be a first elliptical quarter arc shape and the second arc may be a second elliptical quarter arc shape. The dimensions of the second elliptical quarter arc shape may differ from the dimensions of the first elliptical quarter arc shape.

In yet another embodiment, a guide vane for fully reversibly turbomachinery may include a profiled first edge, a symmetrical second edge opposite the profiled first edge, an upper planar surface, and a lower planar surface. The upper planar surface may span from the profiled first edge to the symmetrical second edge. The lower planar surface may also span from the profiled first edge to the symmetrical second edge. The profiled first edge may be configured to convert rotational flow exiting an impeller of the fully reversible turbomachinery into an axial flow.

In some instances, the profiled first edge may contain a first arc and a second arc. The first arc may curve downwardly from the upper planar surface. The second arc may curve upwardly from the lower planar surface toward the first arc. In even some further instances, the first arc may have a first curvature length and a first curvature height. The second arc may have a second curvature length and a second curvature height. In some additional instances, the second curvature length may be greater than the first curvature length, and the second curvature height may be greater than the first curvature height.

BRIEF DESCRIPTION OF THE DRAWINGS

Like reference numerals have been used to identify like elements throughout this disclosure.

DETAILED DESCRIPTION OF THE INVENTION

Figure 1A:
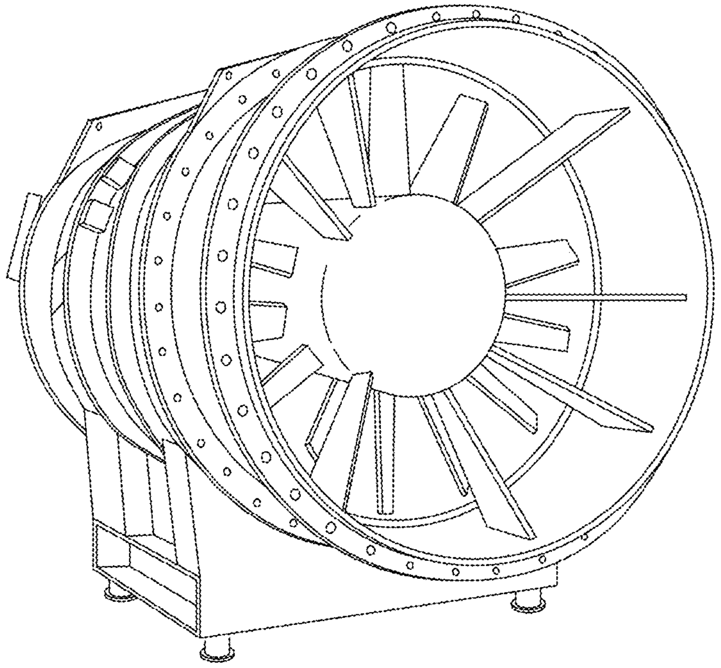
FIG. 1A PRIOR ART
FIG. 1A illustrates a perspective view of an example of a prior art reversible tunnel axial fan.
Figure 1B:
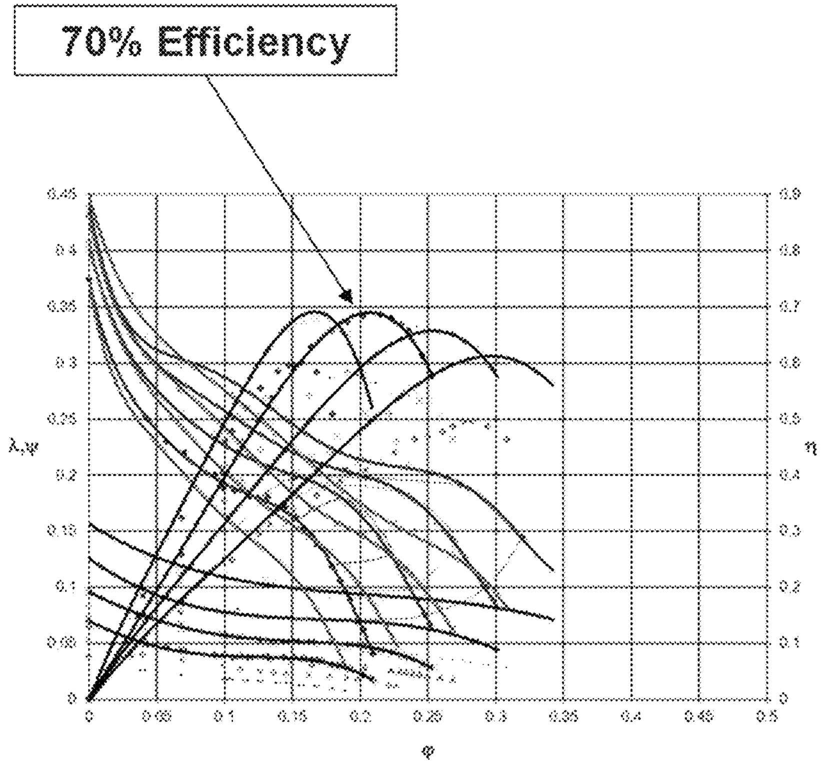
FIG. 1B PRIOR ART
FIG. 1B illustrates a graph that presents the non-dimensional power (λ) and pressure (ψ) coefficients vs. a non-dimensional flow coefficient (φ) vs. efficiency (η) for the prior art reversible tunnel axial fan illustrated in FIG. 1A.
Figure 2:
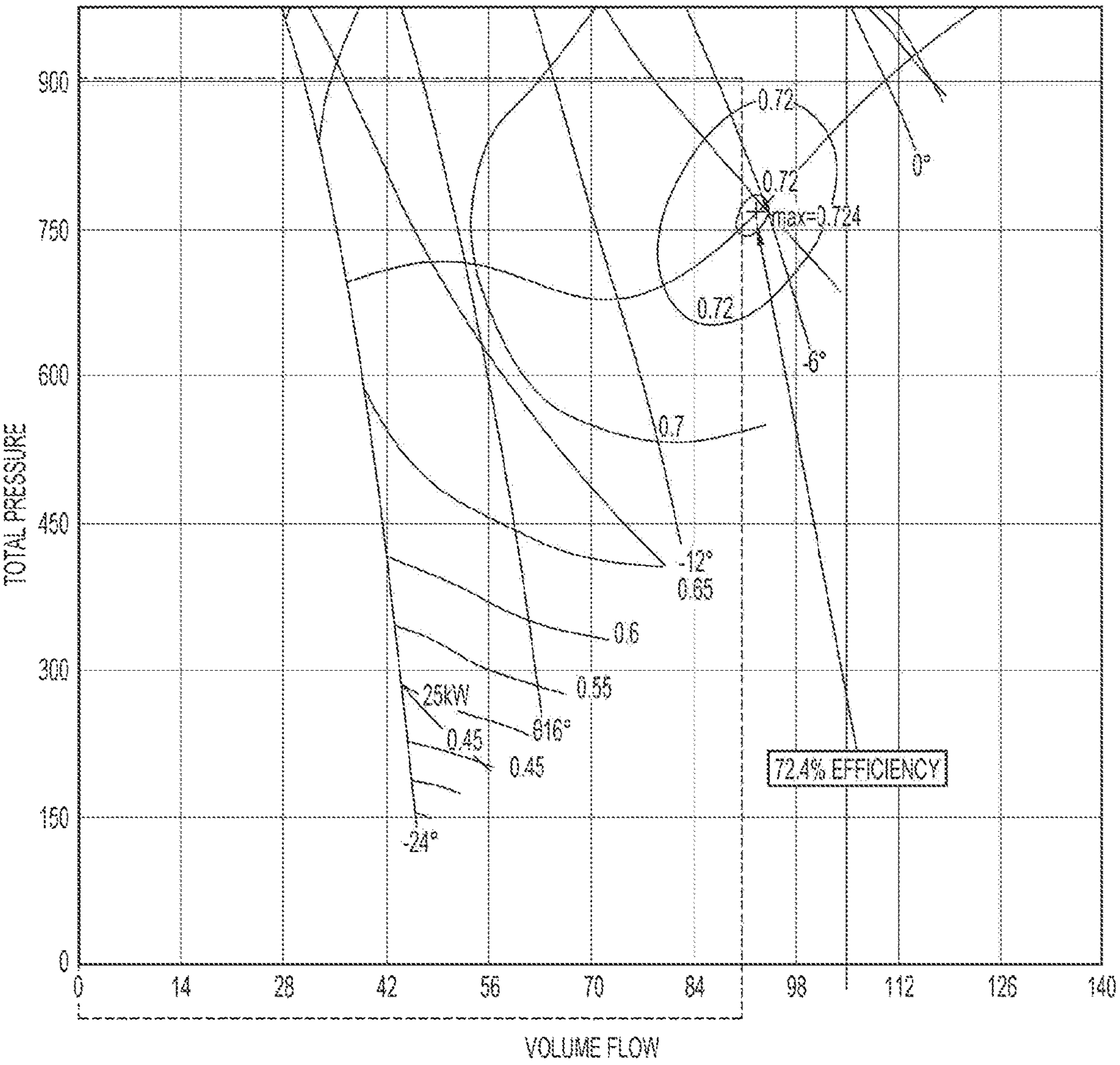
FIG. 2 PRIOR ART
FIG. 2 illustrates a graph that presents total pressure vs. volume flow rate and an associated efficiency contour for a second example of a prior art reversible tunnel axial fan.
Figure 3:
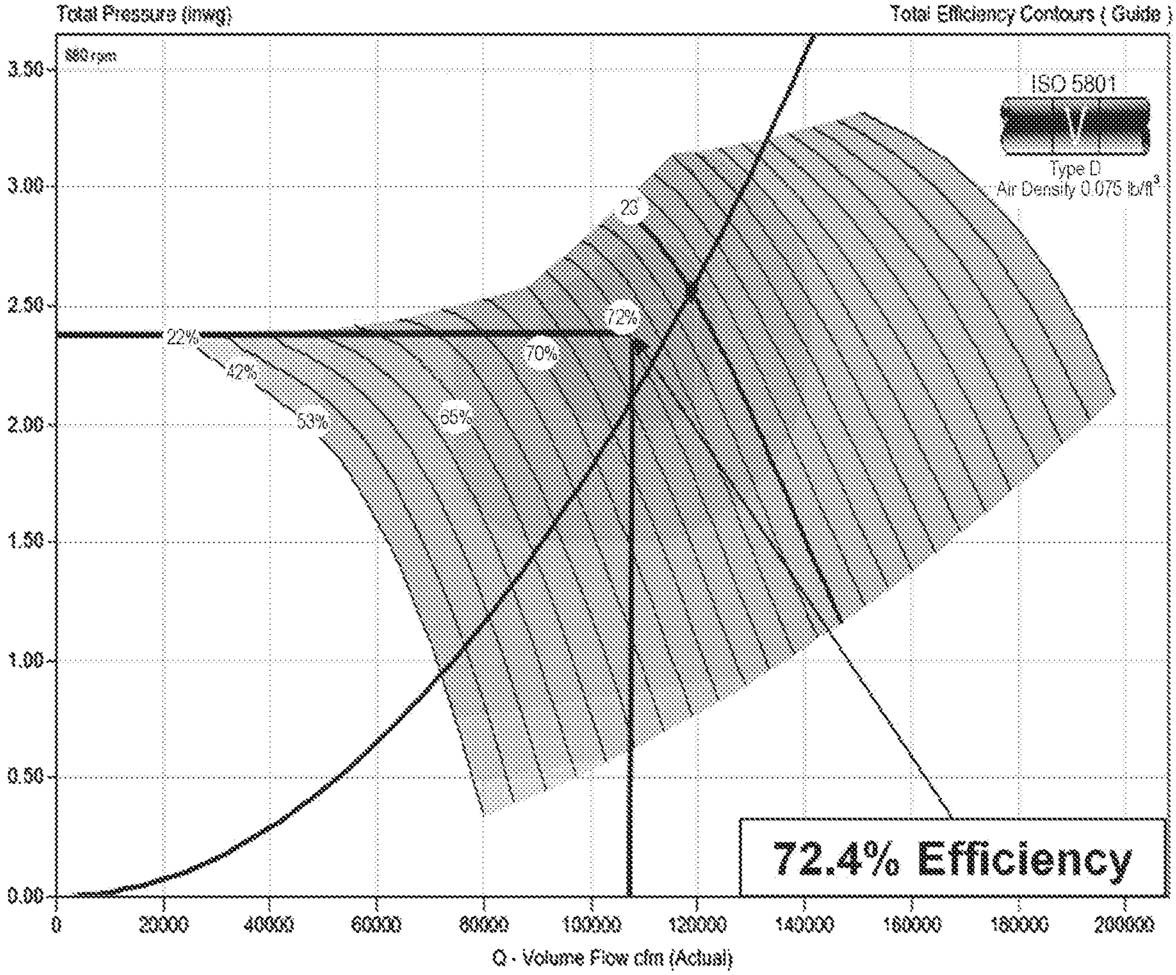
FIG. 3 PRIOR ART
FIG. 3 illustrates a graph that presents total pressure vs. volume flow rate and an associated efficiency contour for a third example of a prior art reversible tunnel axial fan.
Figure 4:
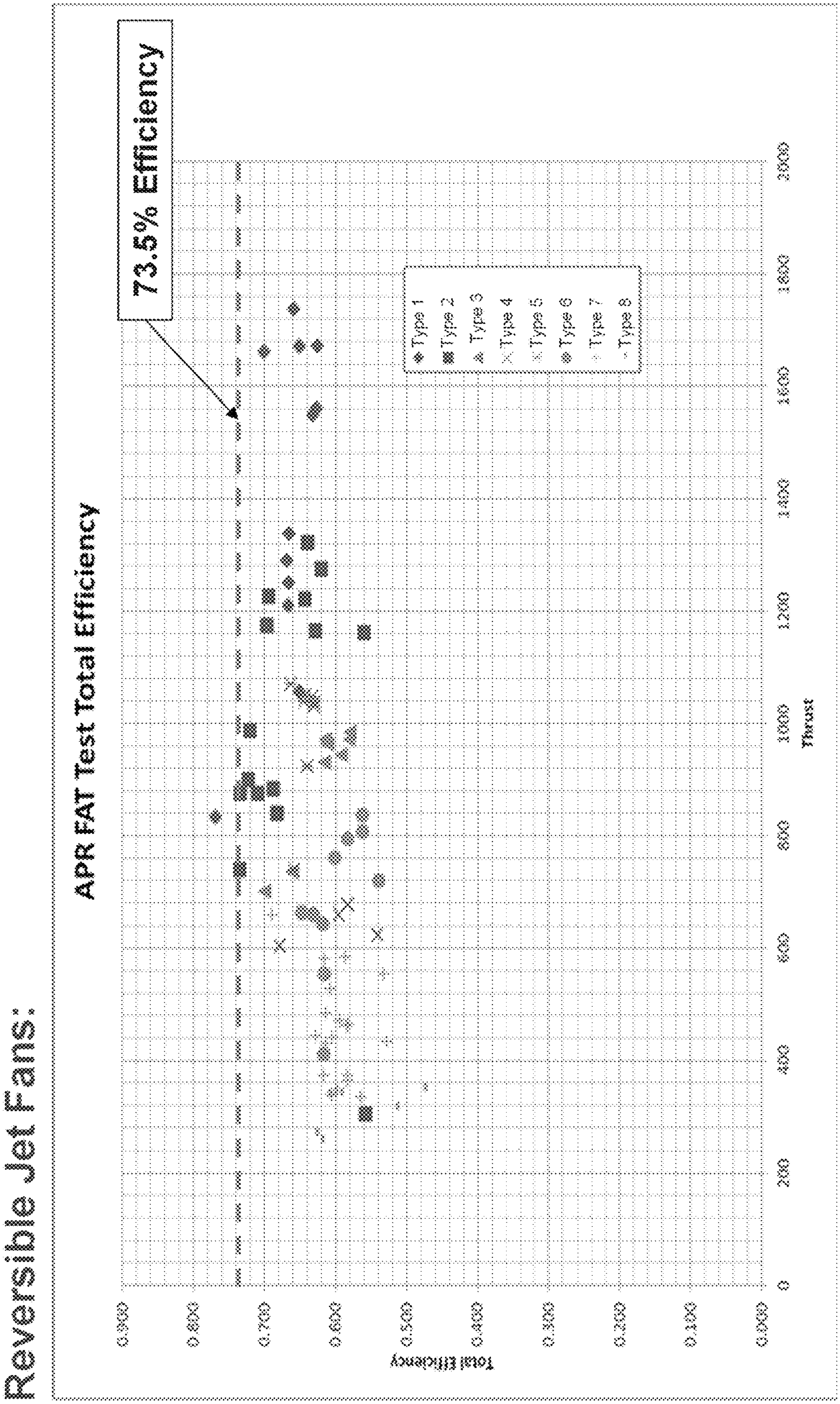
FIG. 4 PRIOR ART
FIG. 4 illustrates a factory acceptance test ("FAT") graph for prior art reversible jet fans that presents total efficiency vs thrust for various reversible jet fans.
Figure 5:
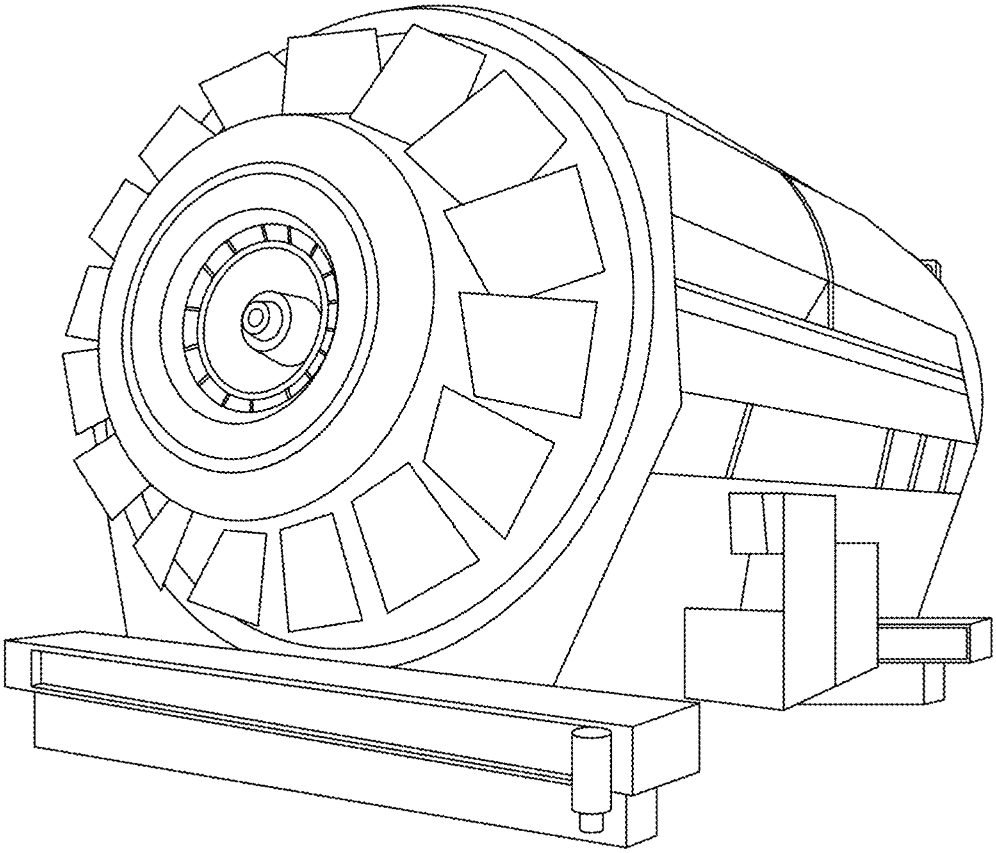
FIG. 5 PRIOR ART
FIG. 5 illustrates a perspective view of a variable pitched axial fan capable of being configured to operate as a semi-reversible axial fan.
Figure 6:
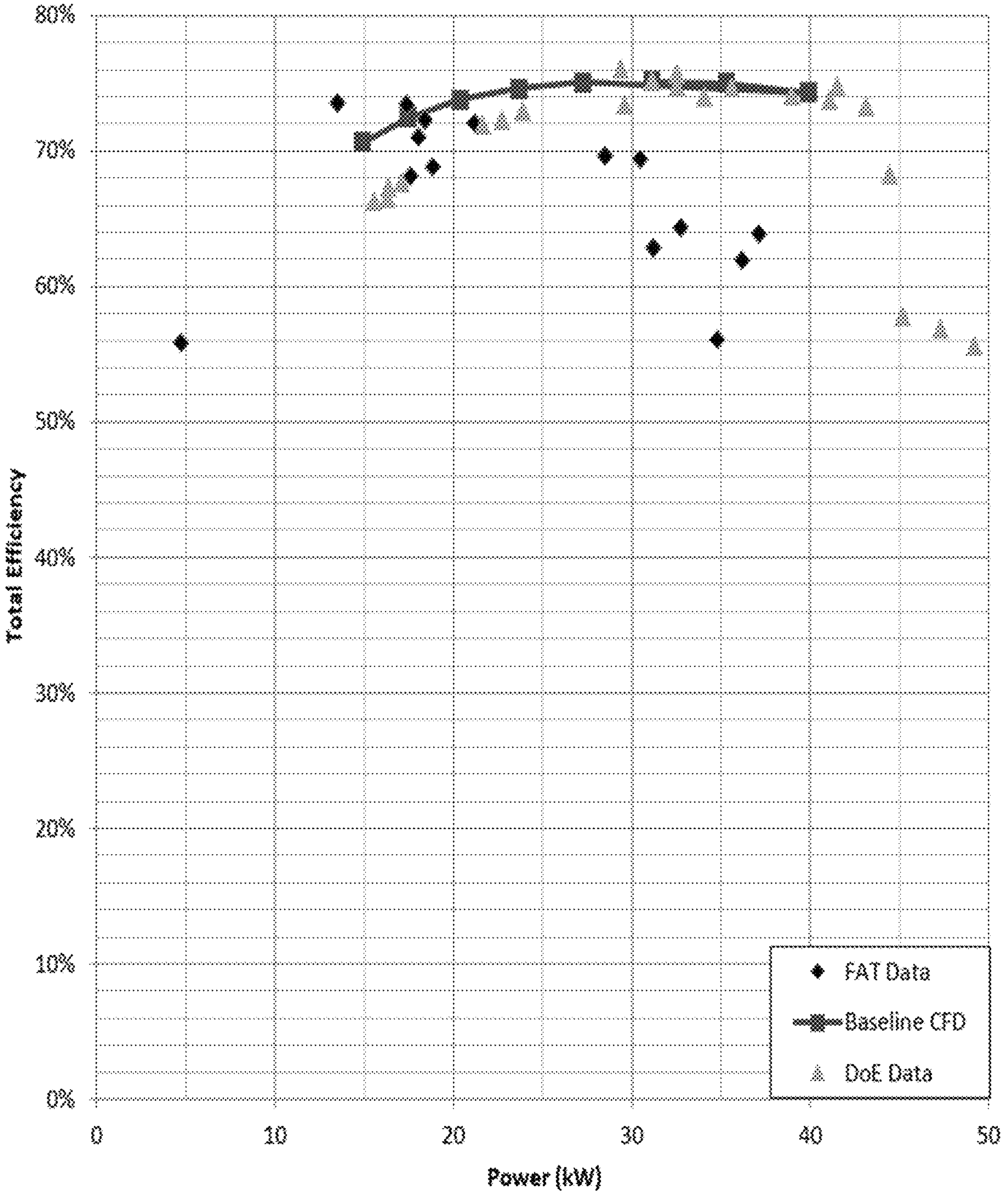
FIG. 6 PRIOR ART
FIG. 6 illustrates a graph for prior art reversible jet fan impeller blade optimization that presents total efficiency vs. power for various blade optimization parameters.
Figure 7:
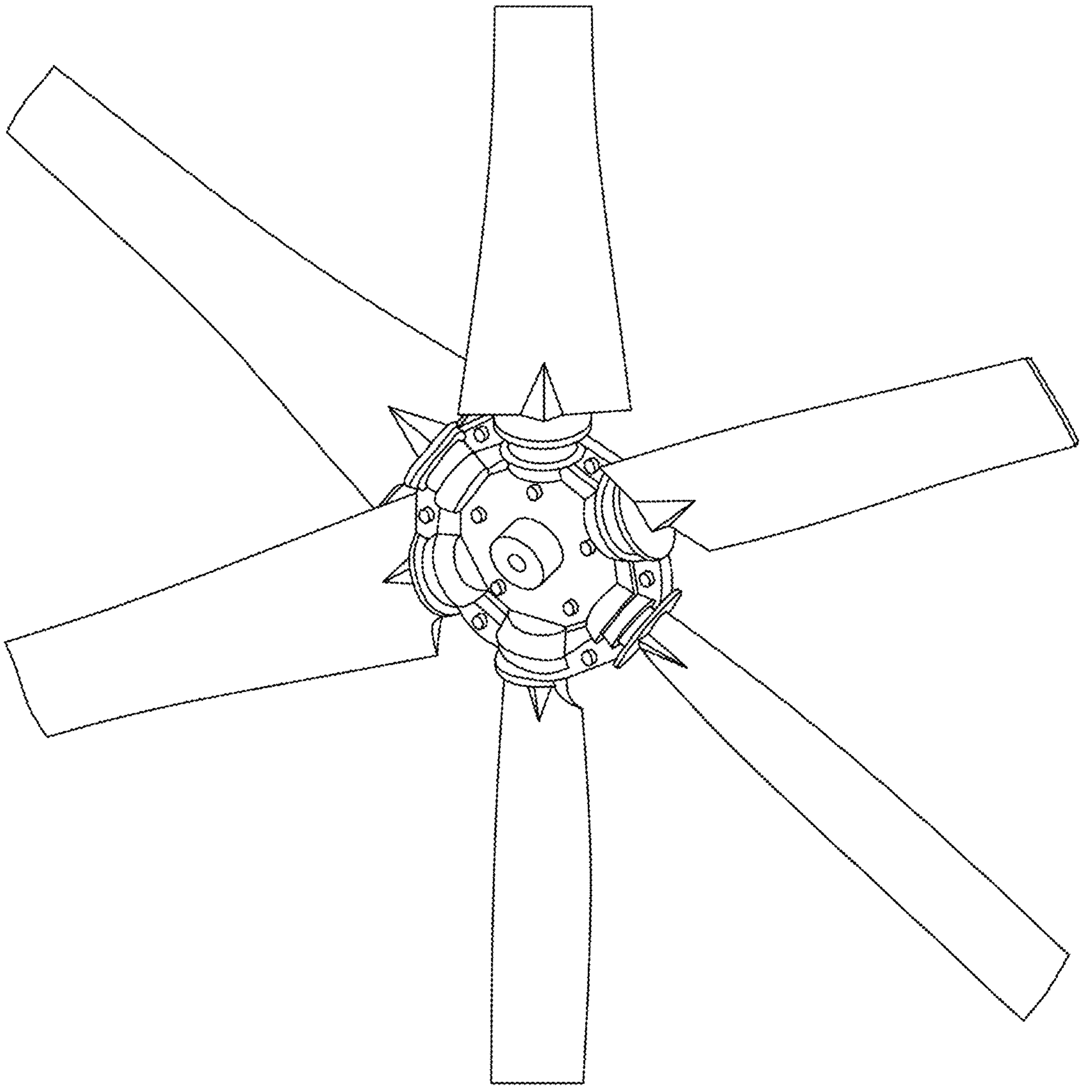
FIG. 7 PRIOR ART
FIG. 7 illustrates a perspective view of another embodiment of a prior art reversible axial fan equipped with fan blades specifically designed for reversible axial fans.

The present invention is directed to a guide vane that has been optimized for operation in fully reversible turbomachinery, where the optimized guide vane efficiently straightens rotational/swirling flow from the impeller when disposed downstream from the impeller, and does not produce pre-rotational/pre-swirling flow (i.e., maintains axial flow) that is delivered to the impeller when disposed upstream from the impeller. As disclosed herein, the fully reversible turbomachine may be an axial fan with an impeller that includes a hub with a series of blades that are configured to rotate about a central axis of a flow pathway (i.e., duct, tunnel, tube, etc.). In other embodiments, the fully reversible turbomachine may be any other type of turbomachinery that is capable of operating in both a forward and reverse operation. Rotation of the impeller may generate a flow of gas (e.g., air) that travels along the flow pathway. The impeller may be configured to rotate in a first rotational direction (e.g., a clockwise direction) to generate a flow of gas in a first flow direction through the turbomachine and in a second rotational direction (e.g., a counterclockwise direction), which is opposite of the first rotational direction, to generate a flow of gas in a second flow direction through the turbomachine. The second flow direction through the turbomachine may be opposite of that of the first flow direction.

Disposed within the flow pathway on either side of the impeller may be a series of guide vanes such that the guide vanes extend radially outward from a central axis of the flow pathway. Each guide vane may be a substantially planar structure with a first edge and a second edge. Regardless of which side of the impeller the guide vanes are located, the first edge may be disposed more proximate to the impeller than the second edge. Thus, the first edge of each of the guide vanes may face the impeller, while the second edge of each of the guide vanes may face away from the impeller. In one embodiment, the first edge may have a profiled shape that is defined by at least a first arc/curvature and a second arc/curvature that collectively form the first edge, where the first arc/curvature and the second arc/curvature differ in their shape parameters/characteristics (e.g., arc length, arc height, curvature, radius, etc.). In other embodiments, the first edge of each guide vane may have a generally elliptical quarter arc shape, where either the semi-major axis or semi-minor axis is oriented parallel to the plane of the guide vane. In some other embodiments, the first edge of each guide vane may have a generally circular quarter arc shape. The second edge of each guide vane may be symmetrically rounded When the guide vanes are positioned downstream of the impeller, the first edge of the guide vane may serve as the leading edge of the guide vane. When downstream of the impeller, the profiled shape of the first edge of the guide vane may be configured to turn the rotational flow coming from the downstream side of the impeller, while the flow remains attached to the guide vane. The symmetrical shape of the second edge of the guide vane may be configured to minimize the wake of the flow as it flows past the second edge and from the guide vane.

Conversely, when the guide vanes are positioned upstream of the impeller, the second edge of the guide vane is the leading edge of the guide vane. When upstream of the impeller, the symmetrical shape of the second edge of the guide vane may be configured to reduce drag over the guide vane. The profiled shape of the first edge of the guide vane may be configured to separate the flow from the guide vane at a desired location instead of turning the flow from an axial flow into a rotational flow before the flow enters the impeller. Equipping fully reversible turbomachinery with the guide vanes disclosed herein may improve the efficiency of the fully reversible turbomachinery such that the fully reversible turbomachinery has an efficiency of approximately 80% or higher (i.e., up to a total efficiency of approximately 83% to 84%).

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding “one embodiment”, “an embodiment”, “an exemplary embodiment”, and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase “A and/or B” means (A), (B), or (A and B). For the purposes of the present disclosure, the phrase “A, B, and/or C” means (A), (B), (C), (A and B), (A and C), (B and C), or (A, B and C).

The terms “comprising,” “including,” “having,” and the like, as used with respect to embodiments of the present disclosure, are synonymous.

Figure 8A:
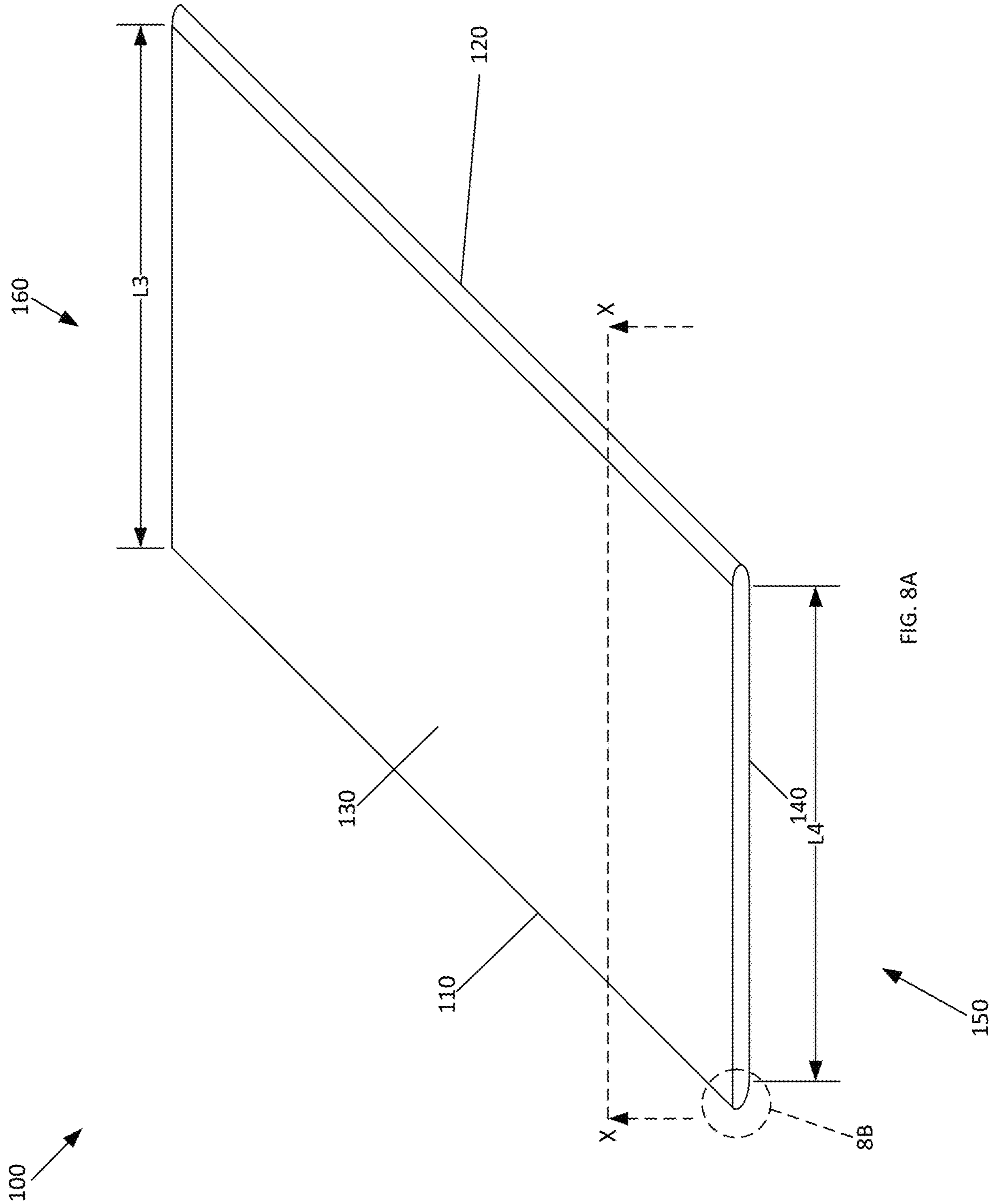
FIG. 8A illustrates a perspective view of an embodiment of a guide vane for use in fully reversible turbomachinery in accordance with the present invention.

Illustrated in FIG. 8A is a perspective view of a schematic illustration of an embodiment of a guide vane 100 that is configured for use in fully reversible turbomachinery. The guide vane 100 illustrated in FIG. 8A is configured to efficiently straighten swirling or rotational flow when disposed downstream of a fully reversible impeller, while also being configured maintain axial flow (i.e., not produce pre-rotational/pre-swirling flow) when disposed upstream of a fully reversible impeller. As illustrated in FIG. 8A, the guide vane 100 may be a substantially planar structure with a first edge 110, an opposite second edge 120, a first or upper planar surface 130, and an opposite second or lower planar surface 140. The guide vane 100 may further include a first end 150 and an opposite second end 160. As explained in further detail below, depending on flow direction of the fully reversible turbomachine and the position in which the guide vane 100 is disposed within the turbomachine with respect to the impeller, the first edge 110 and second edge 120 may serve as the leading and trailing edges of the guide vane 100. When disposed within fully reversible turbomachinery, regardless of the position with respect to the impeller, the first edge 110 may be disposed more proximate to the impeller than the second edge 120. In other words, the first edge 110 may face towards the impeller, while the second edge 120 may face away from the impeller.

Figure 8B:
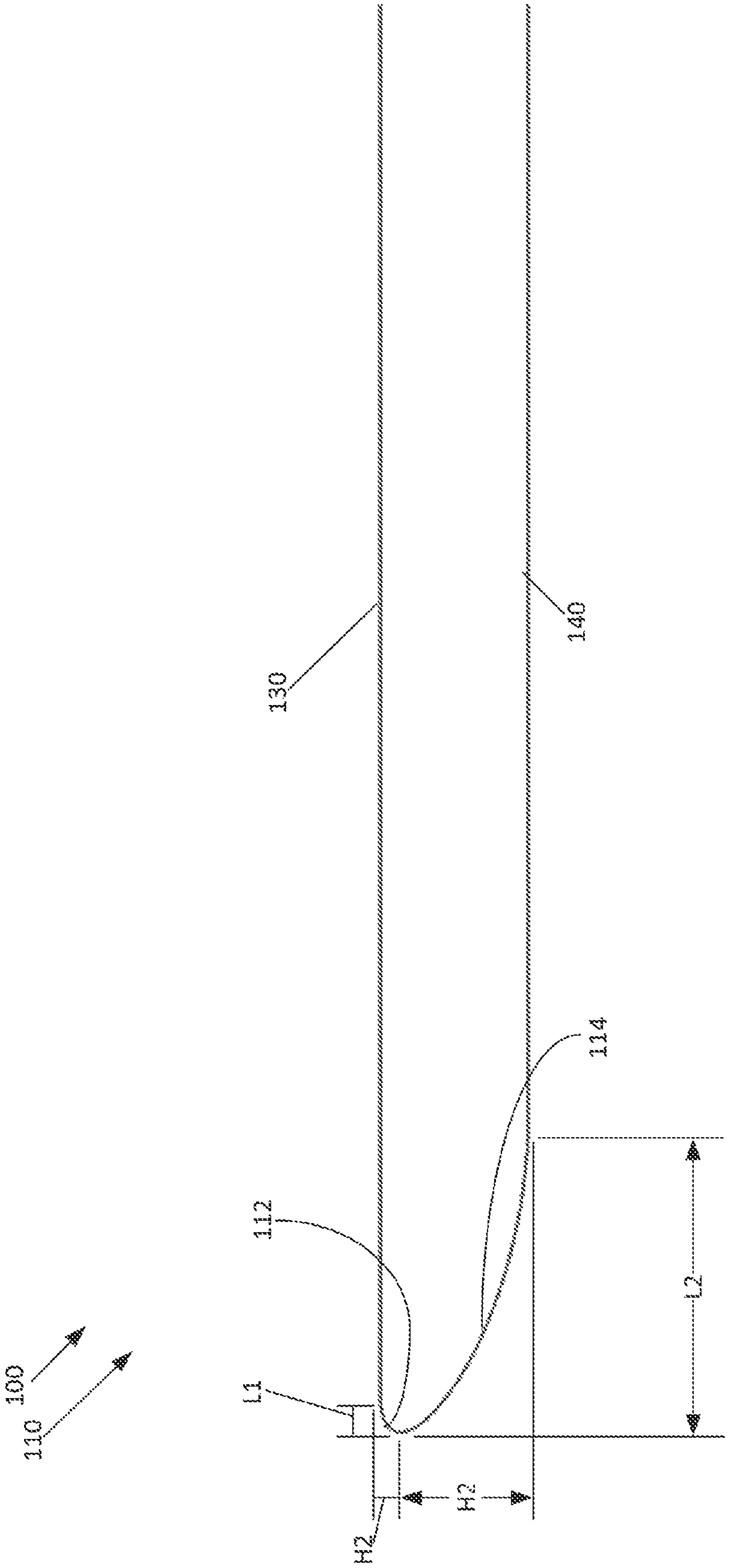
FIG. 8B illustrates an isolated close-up view of the first edge of the embodiment of the guide vane illustrated in FIG. 8A.

As illustrated in FIGS. 8A and 8B, the first edge 110 of the guide vane 100 may have a profiled or asymmetrical shape. For example, in the embodiment illustrated in FIGS. 8A and 8B, the first edge 110 of the guide vane 100 may have a generally elliptical quarter arc shape, where either the semi-major axis or semi-minor axis of the elliptical is oriented parallel to the plane of the guide vane 100. More specifically, as best illustrated in FIG. 8B, the profiled shape of the first edge 110 of the guide vane 100 may be collectively formed/defined by a first arc/curvature 112 and a second arc/curvature 114. The first arc/curvature 112 and the second arc/curvature 114 may collectively form/define the first edge 110, where the first arc/curvature 112 curves downwardly from the first or upper planar surface 130, and where the second arc/curvature 114 curves upwardly from the second or lower planar surface 140 to meet the first arc/curvature 112. As illustrated, the first arc/curvature 112 and the second arc/curvature 114 may differ from one another in their appearance and shape parameters/characteristics (i.e., arc length, arc height, curvature, radius, etc.). In general, the first arc/curvature 112 is smaller than the second arc/curvature 114 as both the length L1 and height H1 of the first arc/curvature 112 are smaller than the length L2 and Height H2 of the second arc/curvature 114. In some embodiments, the first arc/curvature 112 may itself have a generally elliptical quarter arc shape based on a first generally elliptical shape of a first size, while the second arc/curvature 114 may also have a generally elliptical quarter arc shape based on a second generally elliptical shape of a second size. Because of the size differences between the first arc/curvature 112 and the second arc/curvature 114, the profiled shape of the first edge 110 may appear to have a generally elliptical quarter arc shape. In other embodiments of the guide vane, the first edge 110 of the guide vane may have a circular quarter arc shape or generally circular quarter arc shape.

When used herein, the terms "substantially" and "generally", and terms of their families (such as "substantial" and "general", etc.), should be understood as indicating values or shapes very near to those which accompany the aforementioned terms. That is to say, a deviation within reasonable limits from an exact value or shape should be accepted, because a skilled person in the art will understand that such a deviation from the values or shapes indicated is inevitable due to design characteristics, design constraints, measurement inaccuracies, etc. The same applies to the terms "about", "around", and "approximately". Thus, the use of the terms "generally elliptical", "substantially elliptical," "generally circular", and "substantially circular" are intended to refer to shapes that include, but are not limited to, perfectly shaped ellipses, perfectly shaped circles, and shapes that reasonably resemble an ellipse and/or a circle to those of ordinary skill in the art.

Figure 10A:
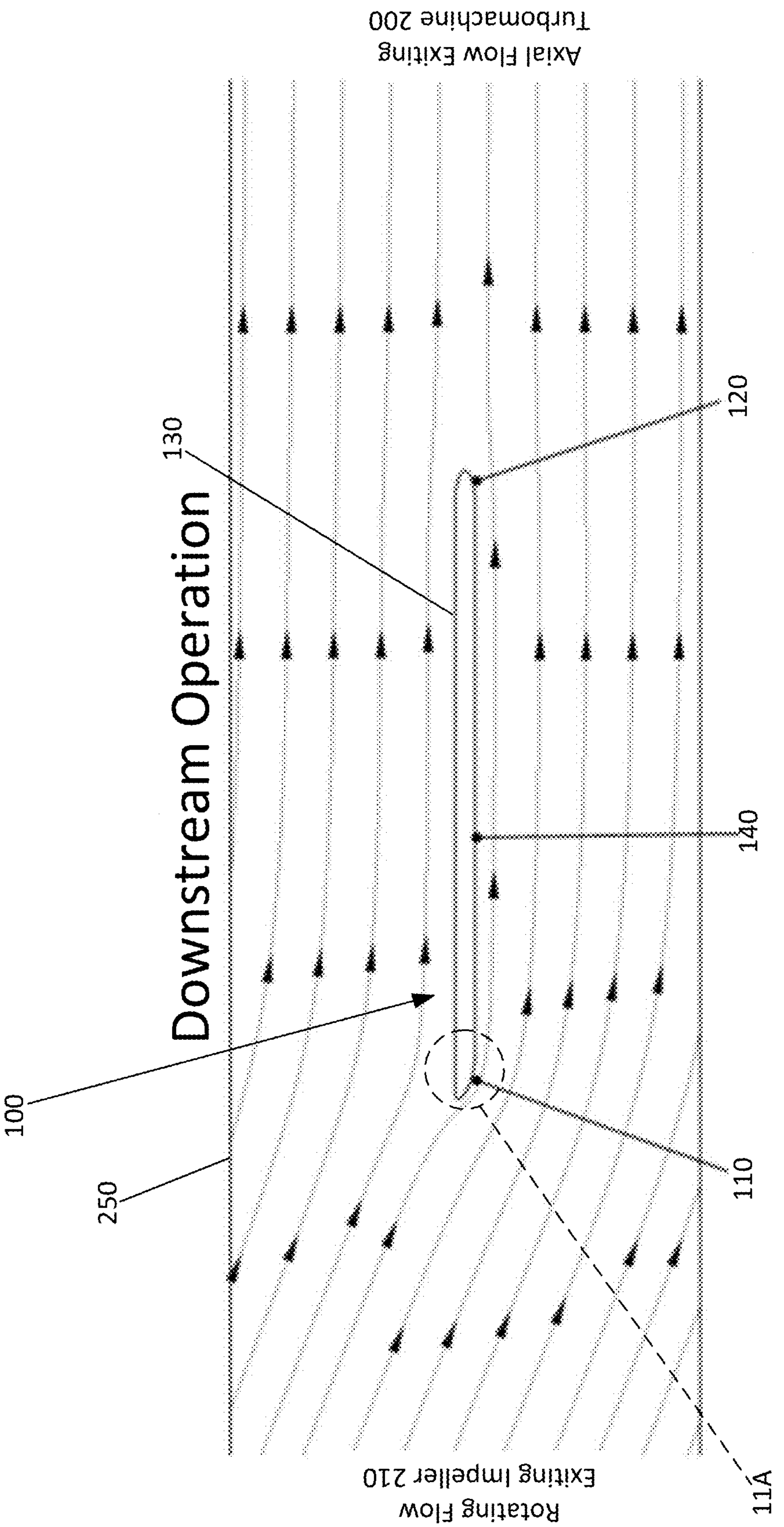
FIG. 10A illustrates a cross sectional view of the embodiment of the guide vane illustrated in FIG. 8A in a cascade, where the cross-section of the guide vane is taken along line X-X in FIG. 8A and where the guide vane is disposed downstream from the impeller.
Figure 10B:
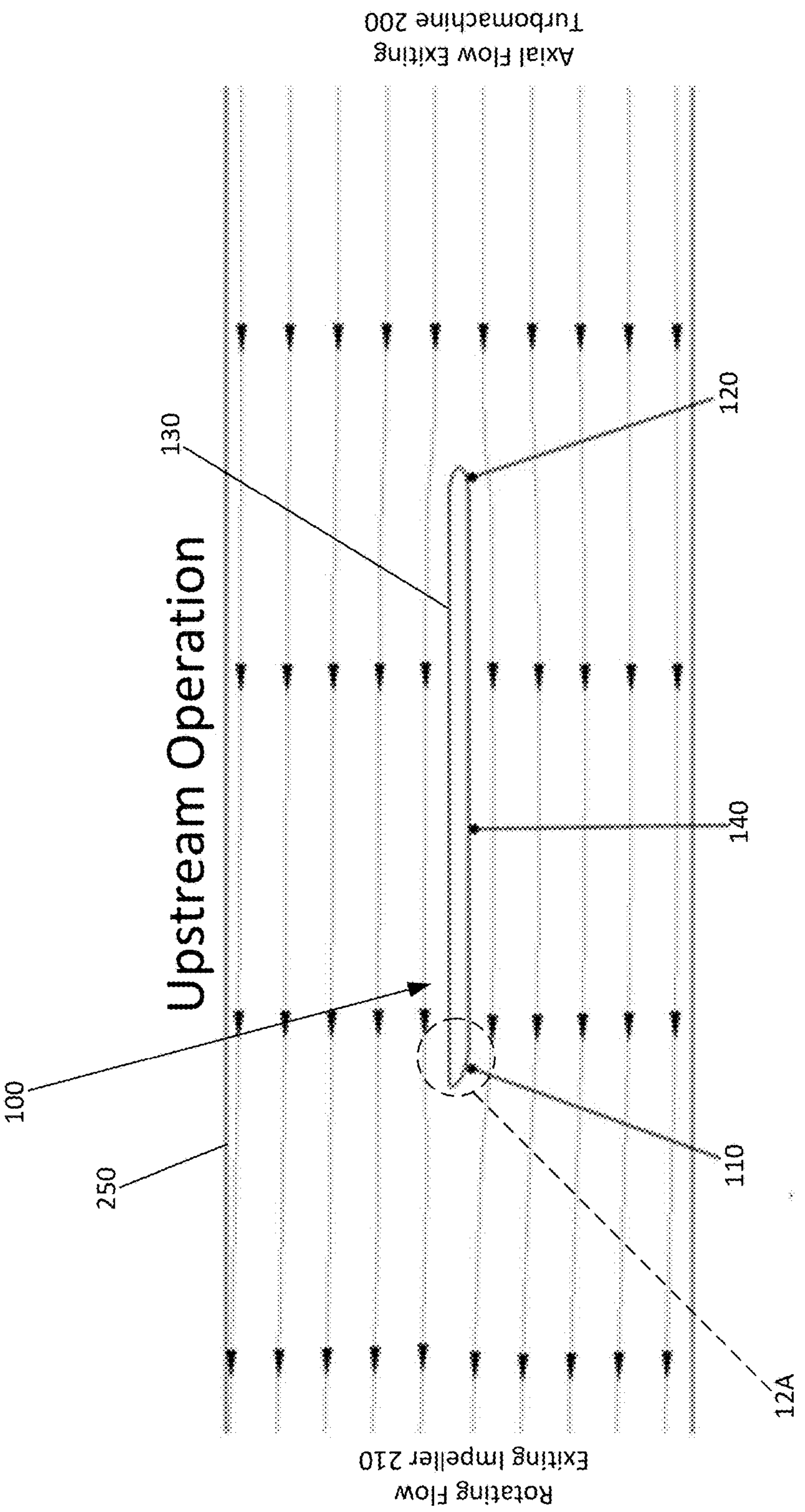
FIG. 10B illustrates a cross sectional view of the embodiment of the guide vane illustrated in FIG. 8A in a cascade, where the cross-section of the guide vane is taken along line X-X in FIG. 8A and where the guide vane is disposed upstream from the impeller.
Figure 11A:
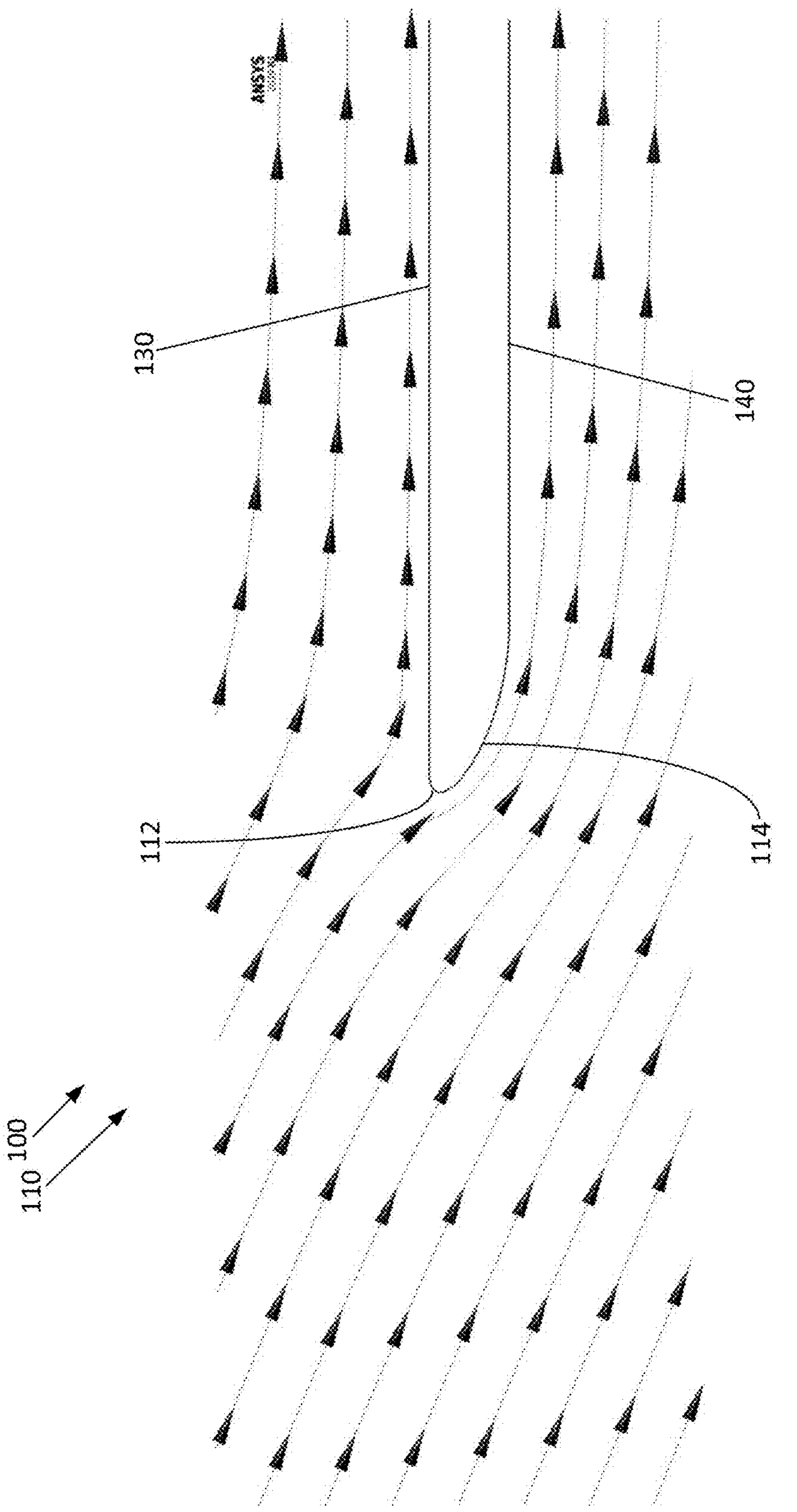
FIG. 11A illustrates an isolated close-up view of the first edge of the guide vane illustrated in FIG. 10A and in a cascade, where the guide vane is disposed downstream from the impeller.
Figure 11B:
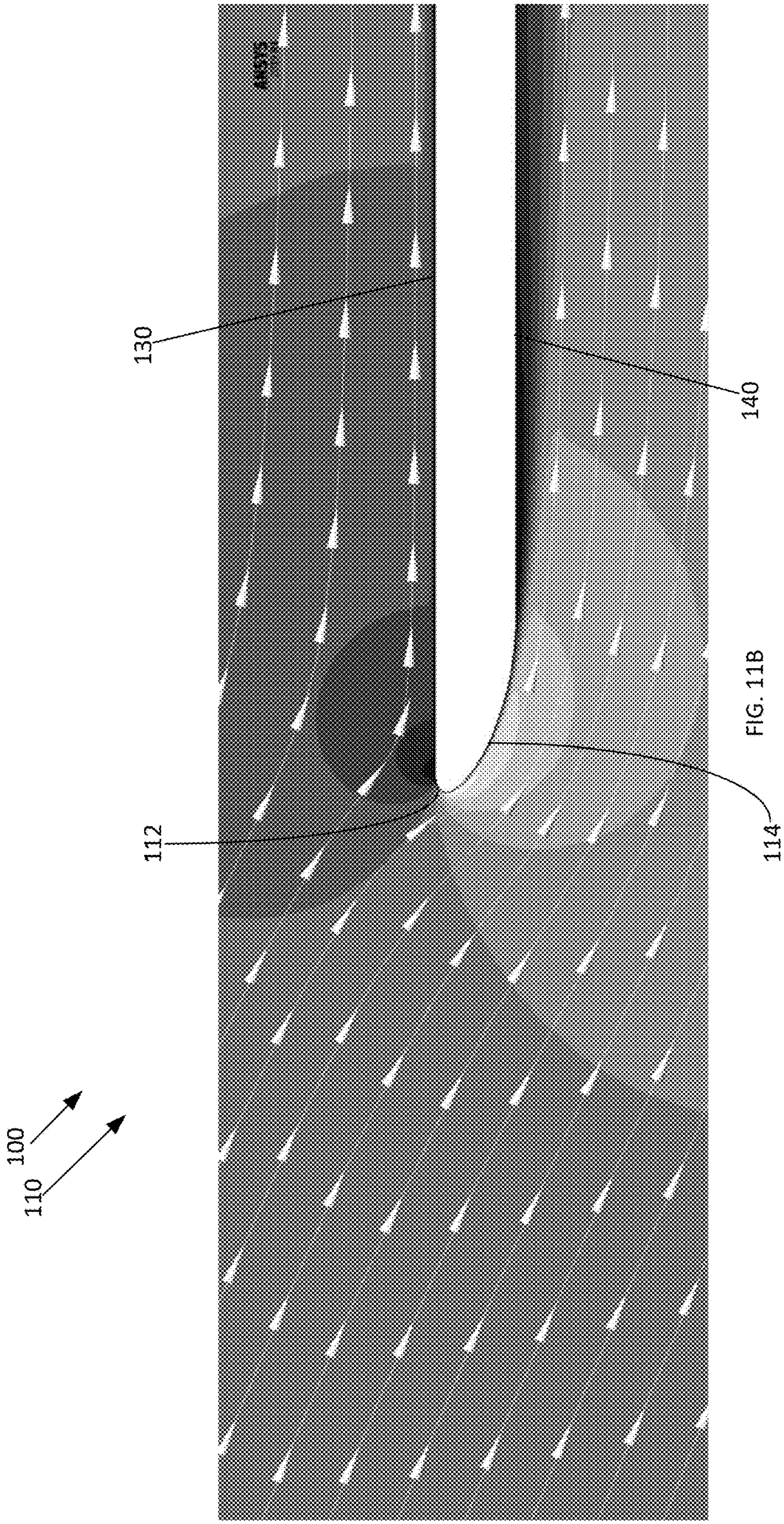
FIG. 11B illustrates an isolated close-up of the first edge of the guide vane illustrated in FIG. 10A and in a cascade with flow velocity contours, where the guide vane is disposed downstream from the impeller.
Figure 12A:
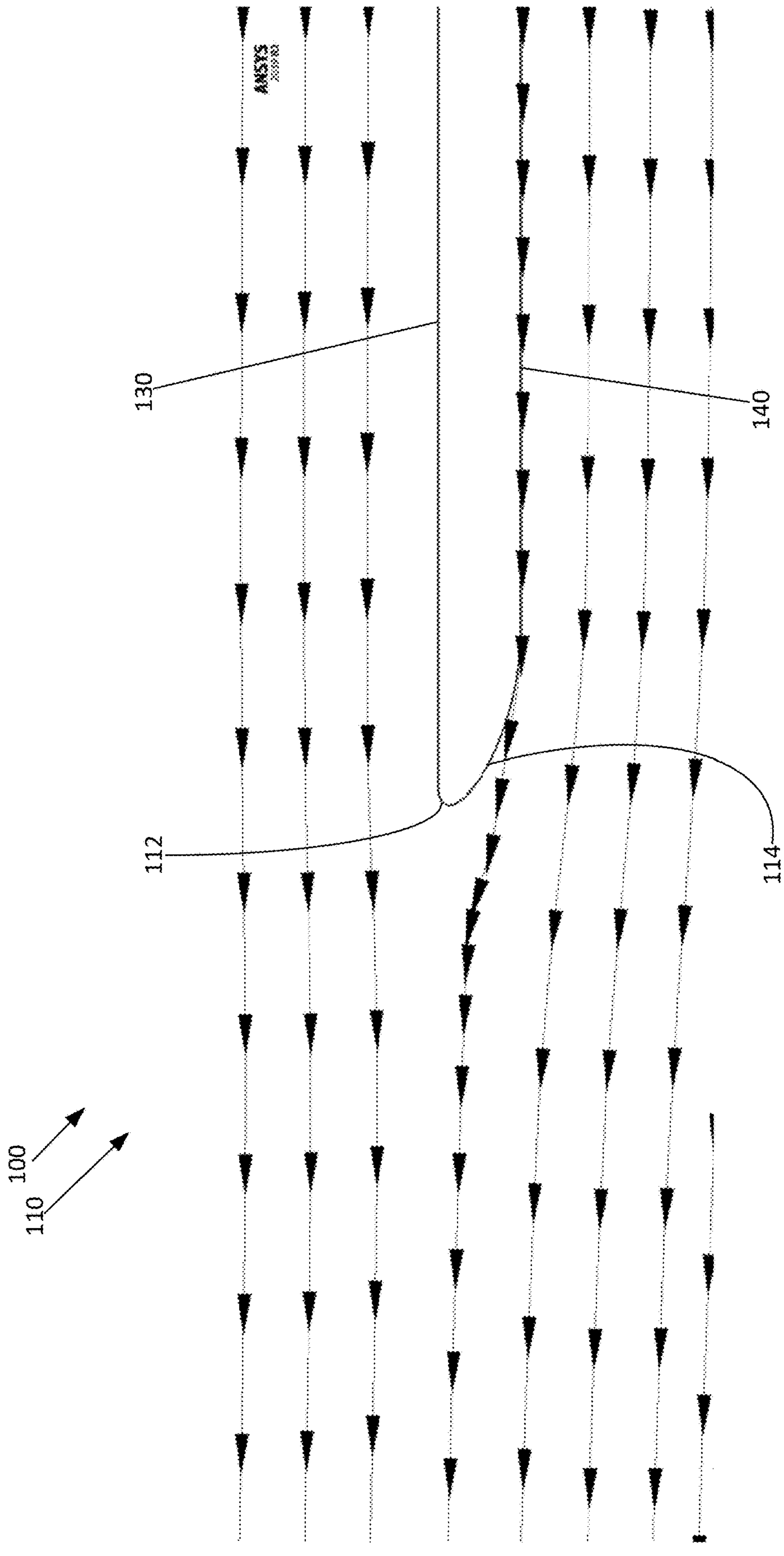
FIG. 12A illustrates an isolated close-up view of the first edge of the guide vane illustrated in FIG. 10B and in a cascade, where the guide vane is disposed upstream from the impeller.
Figure 12B:
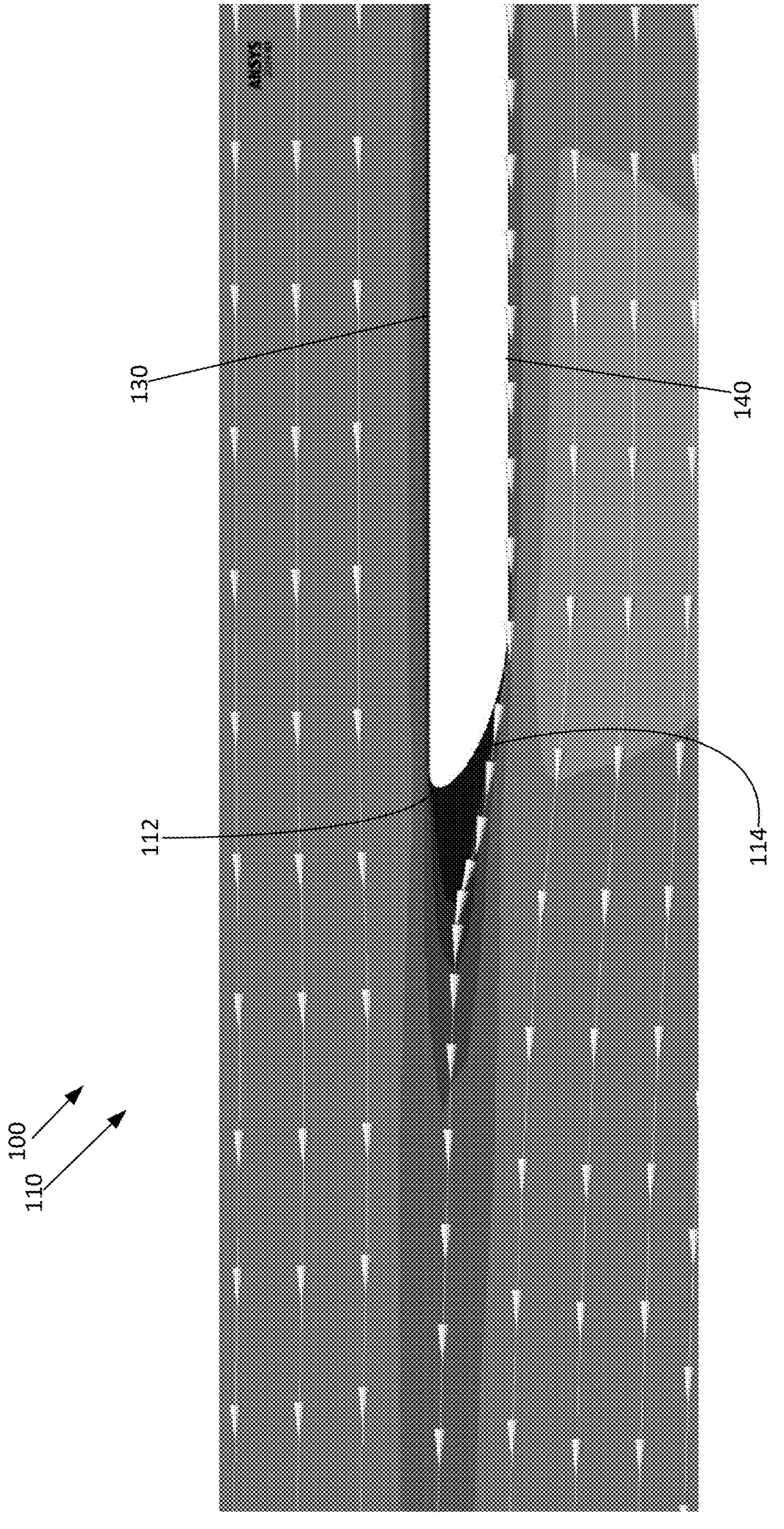
FIG. 12B illustrates an isolated close-up of the first edge of the guide vane illustrated in FIG. 10B and in a cascade with flow velocity contours, where the guide vane is disposed upstream from the impeller.

As further illustrated in FIG. 8A, the second edge 120 of the guide vane 100 may be symmetrically rounded. Thus, the second edge 120 may be a symmetrical half circular shape, a symmetrical half elliptical shape, or any other symmetrical rounded shape. Because of the profiled shape of the first edge 110 and the symmetrical shape of the second edge 120, the second planar surface 140 may be shorter in length L4 (i.e., the length of the lower planar surface of FIG. 8A between the curve of the first edge and the curve of the second edge) than the length L3 of the first planar surface 130 (i.e., the upper planar surface 130 of FIG. 8A between the curve of the first edge 110 and the curve of the second edge 120). As shown and explained in further detail below (and as seen in FIGS. 10A, 11A, and 11B), the shape and profile of the first edge 110, when operating as a leading edge, is designed to turn rotating flow from an impeller into axial flow over the short distance of the curvature of the profile. Furthermore, the shape and profile of the first edge 110, when operating as a trailing edge, as explained in further detail below (and as seen in FIGS. 10B, 12A, and 12B), minimizes the rotation imparted onto a flow by allowing separation of the flow from the guide vane 100 at the curvature of the profiled edge 110.

Figure 9A:
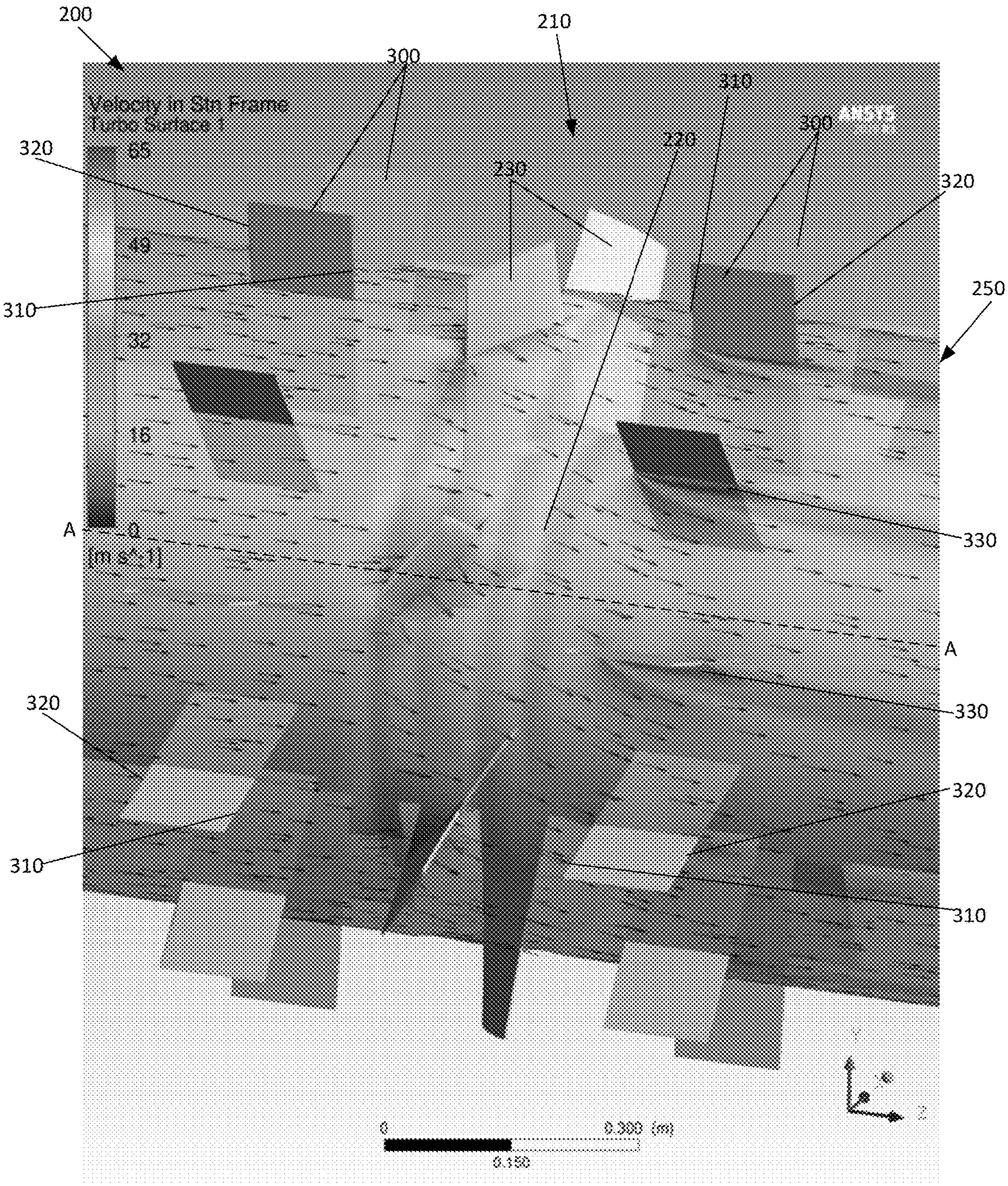
FIG. 9A Prior Art
FIG. 9A illustrates a computational fluid dynamics simulation of the flow of a reversible axial fan equipped with prior art conventional guide vanes.
Figure 9B:
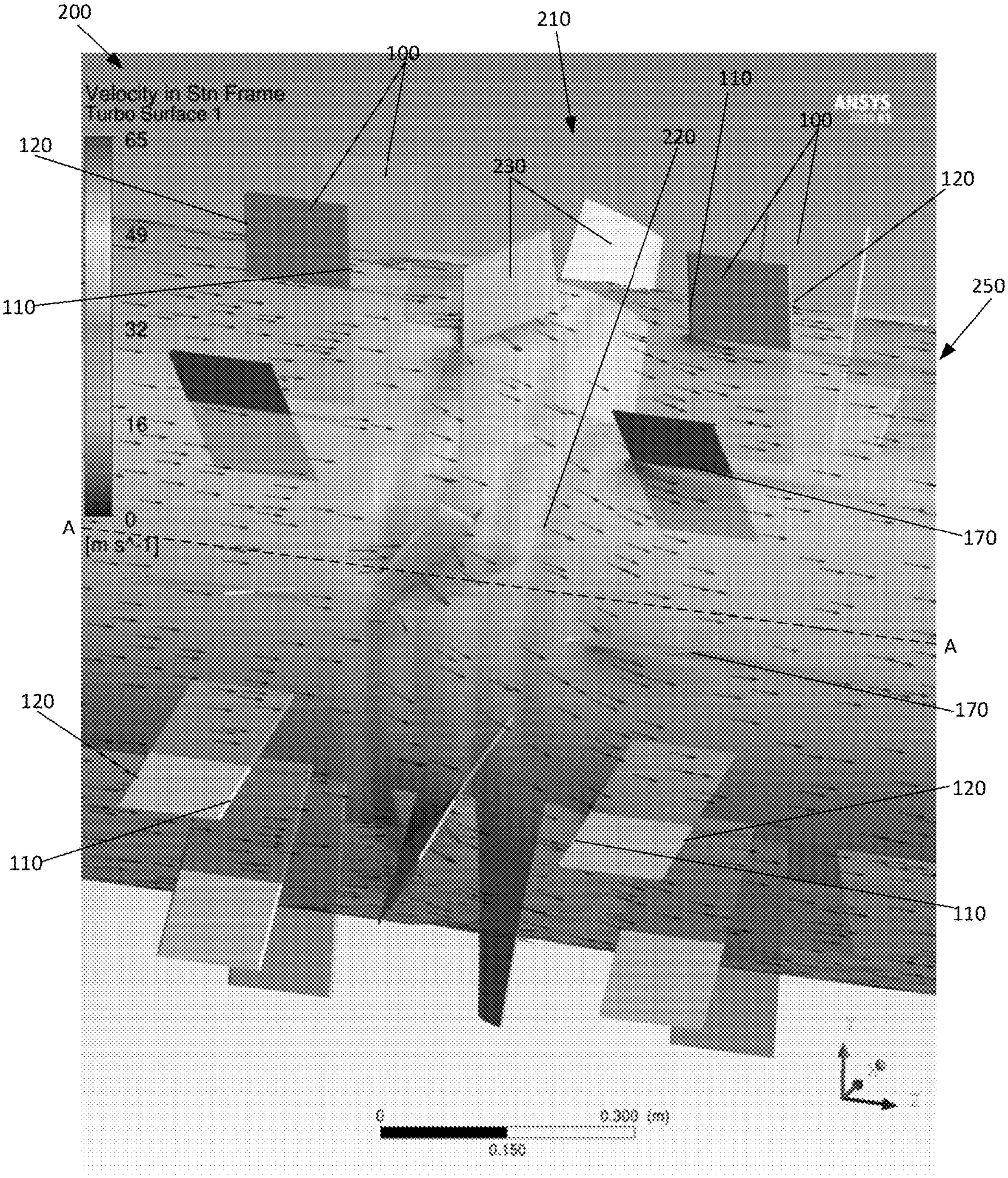
FIG. 9B illustrates a computational fluid dynamics simulation of the flow of a reversible axial fan equipped with the embodiment of the guide vanes illustrated in FIG. 8A, and in accordance with the present invention.

Turning to FIGS. 9A and 9B, illustrated are computational fluid dynamics (hereinafter "CFD") simulations of a fully reversible axial fan or turbomachine 200 equipped with conventional guide vanes 300 (see FIG. 9A) and a fully reversible axial fan 200 equipped with the embodiment of the guide vanes 100 presented in FIG. 8A (see FIG. 9B). As illustrated in both FIGS. 9A and 9B, the fully reversible axial fan 200 includes an impeller 210 that contains a hub 220 with a series of blades 230 radially extending from the hub 220. The impeller 210 may be configured to rotate about a shaft (not shown) that may be aligned (i.e., coaxial) with a central axis A-A of a flow pathway 250 (i.e., duct, tunnel, tube, etc.), where rotation of the impeller 210 generates a pressure difference, and hence a force, to cause a flow through the turbomachine 200. Thus, rotation of the impeller 210 may generate a flow of gas (e.g., air) that travels along the flow pathway 250. The blades 230 of the impeller 210 may have an angle or pitch that generates a rotational flow with an incidence angle in the range of approximately 20-25 degrees relative to a central axis (i.e., the angle of the flow relative to the guide vanes 100, 300). In other embodiments, the impeller blades 230 may be further configured to generate a rotational flow with an incidence angle that is greater than 25 degrees. The impeller 210 may be configured to rotate in a first rotational direction R1 (e.g., a clockwise direction) to generate a flow of gas in a first flow direction F1 through the turbomachine 200 and in a second rotational direction R2 (e.g., a counterclockwise direction), which is opposite of the first rotational direction R1, to generate a flow of gas in a second flow direction F2 through the turbomachine 200. The second flow direction F2 through the turbomachine 200 may be opposite of that of the first flow direction F1.

As illustrated in both FIGS. 9A and 9B, because the axial fan 200 is fully reversible, guide vanes 100, 300 may be disposed on both sides of the impeller 210. Thus, regardless of whether the impeller 210 is rotated in the first rotational direction R1 or the second rotational direction R2, and generates a first flow direction F1 (e.g., a forward flow) or second flow direction F2 (e.g., a reverse flow), guide vanes 100, 300 are positioned both upstream and downstream of the impeller 210. In FIG. 9A, the impeller 210 is rotating in the first rotational direction R1 to generate a flow in a first flow direction F1 (i.e., a forward direction from left to right in the illustrated simulation). The conventional guide vanes 300 disposed to the left of the impeller 210 are upstream of the impeller 210, while the conventional guide vanes 300 disposed to the right of the impeller 210 are downstream of the impeller 210. The conventional guide vanes 300 may be substantially planar structures that have flat, squared, or blunt surfaces for both their first edges 310 and their second edges 320. As illustrated in FIG. 9A, the upstream conventional guide vanes 300 maintain the axial flow as the flow is received by the impeller 210, while the downstream conventional guide vanes 300 are configured to turn the rotational flow coming from the impeller 210 back into an axial flow. However, as illustrated by the darkened flow portions 330 on the backside of the downstream conventional guide vanes 300, while the downstream conventional guide vanes 300 may redirect the rotational flow into an axial flow, there is a significant amount of separation of the flow from the downstream conventional guide vanes 300. Thus, this separation of the flow of the conventional guide vanes reduces the efficiency of the fully reversible axial fan 200, which, as previously explained, is approximately 70-73%.

As mentioned previously, FIG. 9B illustrates a CFD simulation of a fully reversible axial fan 200 that is equipped with a plurality of guide vanes 100 that are equivalent to the guide vane 100 illustrated in FIG. 8A. In FIG. 9B, like that illustrated in FIG. 9A, the impeller 210 is rotating in the first rotational direction R1 to generate a flow in a first flow direction F1 (i.e., a forward direction from left to right in the illustrated simulation). The optimized guide vanes 100 disposed to the left of the impeller 210 are upstream of the impeller 210, while the optimized guide vanes 100 disposed to the right of the impeller 210 are downstream of the impeller 210. As previously explained, the profiled first edge 110 of the upstream optimized guide vanes 100 are disposed more proximate to the impeller 210 than the symmetrical second edge 120 (i.e., the symmetrical second edge 120 of the upstream optimized guide vanes 100 serve as the leading edge of the upstream optimized guide vanes 100 when the impeller 210 rotates in the first rotational direction R1 and the axial fan 200 operates in the forward direction F1). The profiled first edge 110 of the downstream optimized guide vanes 100 are also disposed more proximate to the impeller 210 than the symmetrical second edge 120 (i.e., the profiled first edge 110 of the downstream optimized guide vanes 100 serve as the leading edge of the downstream optimized guide vanes 100 when the impeller 210 rotates in the first rotational direction R1 and the axial fan 200 operates in the forward direction F1). The optimized guide vanes 100 are disposed within the flow pathway 250 such that the optimized guide vanes 100 extend radially outward from a central axis A-A of both the impeller 210 and the flow pathway 250 of the turbomachine 200. Because orientation of the optimized guide vanes 100 disposed to the left of the impeller 210 in FIG. 9B is flipped or mirrored compared to the orientation of the optimized guide vanes 100 disposed to the right of the impeller 210, the second end 160 of the guide vanes 100 disposed to the left of the impeller 210 may be disposed more proximate to the central axis A-A, while the first end 150 of the guide vanes 100 disposed to the right of the impeller 210 may be disposed more proximate to the central axis A-A.

As further illustrated in FIG. 9B, the upstream optimized guide vanes 100 maintain the axial flow as the flow is received by the impeller 210, while the downstream optimized guide vanes 100 are configured to turn the rotational flow coming from the impeller 210 back into an axial flow. Because of the profiled first edge 110 of the downstream optimized guide vanes 100, the darkened flow portion 170 on the backside (e.g., the lower planar surface 140 of the guide vanes 100) of the downstream optimized guide vanes 100 is smaller than that of the downstream conventional guide vanes 300 illustrated in FIG. 9A. In other words, the amount of flow separation from the downstream optimized guide vanes 100 is smaller or reduced in comparison with that of the amount of flow separation from the downstream conventional guide vanes 300. This results in a fully reversible axial fan 200 equipped with the optimized guide vanes 100 being more efficient than a fully reversible axial fan 200 equipped with conventional guide vanes 300, where a fully reversible axial fan 200 equipped with the optimized guide vanes 100 may be approximately 80% efficient or higher (i.e., up to a total efficiency of approximately 83% to 84%).

Turning to FIGS. 10A and 10B, illustrated are schematic views of a single guide vane 100 in a cascade shown in a downstream operation (FIG. 10A) and an upstream operation (FIG. 10B). In other words, FIG. 10A may illustrate the operations of one of the guide vanes 100 disposed to the right of the impeller 210 of FIG. 9B when the impeller 210 operates in a first rotational direction R1 that generates a first flow direction F1 (i.e., a forward operation), or may illustrate one of the guide vanes 100 disposed to the left of the impeller 210 of FIG. 9B when the impeller 210 operates in a second rotational direction R2 that generates a second flow direction F2 (i.e., a reverse operation). Similarly, FIG. 10B may illustrate the operations one of the guide vanes 100 disposed to the left of the impeller 210 of FIG. 9B when the impeller 210 operates in a first rotational direction R1 that generates a first flow direction F1 (i.e., a forward operation), or may illustrate one of the guide vanes 100 disposed to the right of the impeller 210 of FIG. 9B when the impeller 210 operates in a second rotational direction R2 that generates a second flow direction F2 (i.e., a reverse operation).

As best illustrated in FIGS. 10A, 11A, and 11B, when in a downstream operation, rotating flow exits the impeller 210, which results in the flow approaching the guide vane at an angle. By minimizing adverse pressure gradients with the profiled shape of the first edge 110 (i.e., the leading edge), the flow is primarily turned before approaching the straight section/second planar surface 140 of the guide vane 100. The flow is further straightened along the straight section/second planar surface 140 of the guide vane 100. This is best shown in the close-up views of the first edge 110 illustrated in FIGS. 11A and 11B. After the flow travels along the first planar surface 130 and the second planar surface 140 of the guide vane 100, the flow approaches the symmetric shape at the second edge 120 of the guide vane 100, where the flow has minimal separation and thus minimal wake size especially when compared to the conventional guide vanes 300 for fully reversible turbomachinery 200 (e.g., see the comparison of flow separation between FIGS. 9A and 9B). This is further illustrated in FIG. 11B, where the darker contours represent low flow velocity, and where the lighter contours represent higher flow velocity. The minimal separation and minimal wake size are achieved by maximizing the time the flow remains attached to the first and second planar surfaces 130, 140 of the guide vane 100 by minimizing adverse pressure gradients. The flow then exits the turbomachine 200 with an axially aligned direction.

As best illustrated in FIGS. 10B, 12A, and 12B, when operating in an upstream operation, the flow enters the turbomachine 200 axially and approaches the symmetrical second edge 120 of the guide vane 100. The gradual curvature of the symmetrical second edge 120, which serves as a leading edge in this operation, minimizes pressure drag. The flow continues axially along the first and second planar surfaces 130, 140 of the guide vane 100 before reaching the profiled first edge 110, which serves as a trailing edge in this operation. As best illustrated in FIGS. 12A and 12B, the flow may begin to turn around the profiled first edge 110, but the pressure gradient becomes too great, which causes the flow to separate before being turned any appreciable amount. In FIG. 12B, a series of contours are shown, where the darker the contours, the lower the flow velocity, and where the lighter the contours, the higher the flow velocity. Thus, the flow vectors in the lighter contours have a higher flow velocity that the flow vectors in the darker contours. The flow then leaves the guide vane 100 with a small wake and axially aligned flow, which then enters the impeller 210.

As previously explained, the shape of the profiled first edge 110 is essential in the design of the optimized guide vane 100 shown in FIGS. 8A, 8B, 9B, 10A, 10B, 11A, 11B, 12A, and 12B. When disposed in a downstream operation, the profiled first edge 110 may be configured to turn the flow over a short distance of the first edge 110 of the optimized guide vane 100. In other words, the profiled first edge 110 removes the need for any amount of camber on the guide vanes 100 when used in fully reversible turbomachinery 200. Conversely, when disposed in an upstream operation, the profiled shape of the first edge 110 may also be configured to minimize the turning of the flow by allowing separation from the guide vane 100 at a desirable location, which retains the flow as an axial flow as it enters the impeller 210. Thus, the profiled shape of the first edge 110 of the optimized guide vane 100 may be balanced to allow the turning of rotational flow exiting the impeller 210, without separation or with minimal separation, when the optimized guide vane 100 is disposed in a downstream operation, while allowing the flow to separate from the guide vane 100 at a desired location to maintain an axial flow (i.e., the guide vane 100 does not impart a pre-swirl or pre-rotation of the flow) when disposed in an upstream operation. The design of the optimized guide vane 100 disclosed herein could be considered a form of passive flow control.

In addition to the benefits mentioned above, when disposed in a downstream operation, the efficacy of the design of the optimized guide vane 100 in turning the rotational flow into an axial flow over a short distance allows the thickness of the guide vane 100 to be minimized, which results in reduced losses of the turbomachine 200 due to drag. Additionally, when disposed in an upstream operation, the thinner guide vane 100 and smaller feature size on the profiled first edge 110 minimizes the amount of work that can be done in pre-swirling or pre-rotating the flow before it enters the impeller 210.

The design of the optimized guide vane 100 disclosed herein, and best illustrated in FIGS. 8A, 8B, 9B, 10A, 10B, 11A, 11B, 12A, and 12B, significantly improves the total efficiency of fully reversible turbomachinery 200. The design of the optimized guide vane 100 may improve the total efficiency of fully reversible turbomachinery 200 from approximately 72% to approximately 80%, or by approximately 8%, and in some instance, may improve the total efficiency of fully reversible turbomachinery 200 up to approximately 83%-84%. Thus, the design of the optimized guide vane 100 may increase the efficiency performance of fully reversible turbomachinery 200 to be substantially equivalent to the efficiency performance of unidirectional turbomachinery.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the profiled first edge of the optimized guide vane may be of any shape and size that is configured to turn rotational flow exiting an impeller into axial flow when the optimized guide vane is in a downstream operation. The profiled first edge of the optimized guide vane may also be of any shape and size that is configured to minimize the imparting of rotational flow into the axial flow entering the impeller when the optimized guide vane is in an upstream operation.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the guide vanes described herein, or portions thereof may be fabricated from any suitable material or combination of materials, such as, but not limited to, plastics, metals (e.g., copper, bronze, aluminum, steel, etc.), wood, as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. A guide vane for fully reversible turbomachinery, the guide vane comprising:

a planar structure including:

an asymmetrical first edge configured to turn rotational flow exiting an impeller of the fully reversible turbomachinery into axial flow;

a symmetrical second edge opposite of the asymmetrical first edge;

an upper planar surface extending from the asymmetrical first edge to the symmetrical second edge; and a lower planar surface opposite the upper planar surface, the lower planar surface extending from the asymmetrical first edge to the symmetrical second edge.

2. The guide vane according to claim 1, wherein the asymmetrical first edge contains a first arc and a second arc that collectively define the asymmetrical first edge.

3. The guide vane according to claim 2, wherein the first arc curves downwardly from the upper planar surface and the second arc curves upwardly from the lower planar surface.

4. The guide vane according to claim 3, wherein the upper planar surface has a first length spanning between the asymmetrical first edge and the symmetrical second edge, and the lower planar surface has a second length spanning between the asymmetrical first edge and the symmetrical second edge, the first length being greater than the second length.

5. The guide vane according to claim 2, wherein the first arc has a first curvature length and a first curvature height, and wherein the second arc has a second curvature length and a second curvature height, the second curvature length being greater than the first curvature length, and the second curvature height being greater than the first curvature height.

6. The guide vane according to claim 2, wherein the first arc is a first elliptical quarter arc shape and the second arc is a second elliptical quarter arc shape, and wherein dimensions of the second elliptical quarter arc shape differs from dimensions of the first elliptical quarter arc shape.

7. The guide vane according to claim 1, wherein the symmetrical second edge contains a symmetrical rounded shape.

8. A fully reversible turbomachinery comprising:

an impeller configured to rotate in a first rotational direction, where the impeller rotating in the first rotational direction causes gas to flow in a first flow direction through the fully reversible turbomachinery, and a second rotational direction, where the impeller rotating in the second rotational direction causes the gas to flow in a second flow direction through the fully reversible turbomachinery, the second rotational direction being opposite of that of the first rotational direction, the first flow direction being opposite of the second flow direction; and one or more guide vanes disposed in proximity to the impeller, each guide vane including:

an asymmetrical first edge configured to convert a rotational flow exiting the impeller into a downstream axial flow;

a symmetrical second edge opposite of the asymmetrical first edge, wherein each guide vane is disposed in proximity to the impeller such that the asymmetrical first edge is disposed more proximate to the impeller than the symmetrical second edge;

an upper planar surface extending from the asymmetrical first edge to the symmetrical second edge; and a lower planar surface opposite the upper planar surface, the lower planar surface extending from the asymmetrical first edge to the symmetrical second edge.

9. The fully reversible turbomachinery according to claim 8, wherein the impeller includes a first side and an opposing second side, and wherein the one or more guide vanes include at least a first guide vane disposed more proximate to the first side of the impeller than the second side of the impeller and a second guide vane disposed more proximate to the second side of the impeller than the first side.

10. The fully reversible turbomachinery according to claim 9, wherein, when the impeller rotates in the first rotational direction, the first guide vane maintains an upstream axial flow entering the impeller and the second guide vane converts the rotating flow exiting the impeller into the downstream axial flow.

11. The fully reversible turbomachinery according to claim 10, wherein the asymmetrical first edge of the second guide vane converts the rotational flow exiting the impeller into the downstream axial flow.

12. The fully reversible turbomachinery according to claim 9, wherein, when the impeller rotates in the second rotational direction, the second guide vane maintains an upstream axial flow entering the impeller and the first guide vane converts the rotating flow exiting the impeller into the downstream axial flow.

13. The fully reversible turbomachinery according to claim 12, wherein the asymmetrical first edge of the first guide vane converts the rotational flow exiting the impeller into the downstream axial flow.

14. The fully reversible turbomachinery according to claim 8, wherein the asymmetrical first edge of each of the one or more guide vanes contains a first arc and a second arc that collectively define the asymmetrical first edge.

15. The fully reversible turbomachinery according to claim 14, wherein the first arc has a first curvature length and a first curvature height, and wherein the second arc has a second curvature length and a second curvature height, the second curvature length being greater than the first curvature length, and the second curvature height being greater than the first curvature height.

16. The fully reversible turbomachinery according to claim 14, wherein the first arc is a first elliptical quarter arc shape and the second arc is a second elliptical quarter arc shape, and wherein dimensions of the second elliptical quarter arc shape differs from dimensions of the first elliptical quarter arc shape.

17. A guide vane for a fully reversible turbomachinery, the guide vane comprising:

a profiled first edge;

a symmetrical second edge opposite the profiled first edge;

an upper planar surface spanning from the profiled first edge to the symmetrical second edge; and a lower planar surface opposite the upper planar surface, the lower planar surface spanning from the profiled first edge to the symmetrical second edge, wherein the profiled first edge is configured to convert rotational flow exiting an impeller of the fully reversible turbomachinery into an axial flow.

18. The guide vane according to claim 17, wherein the profiled first edge contains a first arc that curves downwardly from the upper planar surface and a second arc that curves upwardly from the lower planar surface toward the first arc.

19. The guide vane according to claim 18, wherein the first arc has a first curvature length and a first curvature height, and wherein the second arc has a second curvature length and a second curvature height, the second curvature length being greater than the first curvature length, and the second curvature height being greater than the first curvature height.

* * * * *